(12) United States Patent
Okano et al.

(10) Patent No.: US 8,953,254 B2
(45) Date of Patent: Feb. 10, 2015

(54) IMAGE PICKUP LENS AND IMAGE PICKUP UNIT

(71) Applicant: Sony Corporation, Tokyo (JP)

(72) Inventors: Hideaki Okano, Aichi (JP); Yasuhide Nihei, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/945,121

(22) Filed: Jul. 18, 2013

(65) Prior Publication Data
US 2014/0063616 A1 Mar. 6, 2014

(30) Foreign Application Priority Data
Aug. 28, 2012 (JP) ................................. 2012-187996

(51) Int. Cl.
*G02B 3/02* (2006.01)
(52) U.S. Cl.
USPC ............ 359/713; 359/740; 359/756; 359/757
(58) Field of Classification Search
USPC .................. 359/713, 740, 756, 757
See application file for complete search history.

(56) References Cited

U.S. PATENT DOCUMENTS 8,514,499 B2 * 8/2013 Hsu et al. ...................... 359/713

FOREIGN PATENT DOCUMENTS

| JP | 2009-294527 A | 12/2009 |
| JP | 2009-294528 | 12/2009 |
| JP | 2010-262269 | 11/2010 |
| WO | WO-2010/024198 | 3/2010 |

* cited by examiner

*Primary Examiner* — Evelyn A. Lester
(74) *Attorney, Agent, or Firm* — Rader, Fishman & Grauer PLLC

(57) ABSTRACT

An image pickup lens includes: in recited order from object plane toward image plane, a first lens having positive refractive power; a second lens having negative refractive power; a third lens having positive refractive power; a fourth lens having positive or negative refractive power; a fifth lens having positive refractive power; and a sixth lens having negative refractive power and having optical surfaces, one or more of the optical surfaces each having an aspherical shape with one or more inflection points.

9 Claims, 25 Drawing Sheets

IMAGE PICKUP LENS AND IMAGE PICKUP UNIT

BACKGROUND

The present disclosure relates to an image pickup lens suitable for a compact image pickup unit that uses an image pickup device such as a CCD (Charge Coupled Device) and a CMOS (Complementary Metal Oxide Semiconductor). Examples of such a compact image pickup unit may include a digital still camera, a mobile phone with a camera, etc. The present disclosure also relates to an image pickup unit that uses such an image pickup lens.

A mobile phone with a camera, a digital still camera, and the like that use a solid-state image pickup device such as a CCD and a CMOS are known. There has been a demand for further reducing size of such an image pickup unit, and also, a compact lens having a short total optical length is demanded as a lens for shooting to be mounted thereon.

Moreover, recently, also in the compact image pickup unit such as the mobile phone with a camera, pixel density of the image pickup device has been increased while a size thereof has been reduced, and a model provided with an image pickup device having high pixel density equivalent to that of a digital still camera has been widely used. Accordingly, high lens performance suitable for such a high-pixel-density solid-state image pickup unit has been demanded in the image pickup lens mounted on the image pickup unit.

Moreover, a lens having a smaller aperture Fno has been demanded in order to achieve increase in shutter speed while preventing degradation in image quality caused by noise during shooting in a dark place. In such compact and high-performance image pickup lens, an image pickup lens having a configuration with five or more lenses is necessary. For example, Japanese Unexamined Patent Application Publication Nos. 2009-294527 (JP2009-294527A), 2009-294528 (JP2009-294528A), and 2010-262269 (JP2010-262269A), and International Publication No. 2010/024198 (WO2010/024198) disclose an image pickup lens having a five-lens configuration.

SUMMARY

A lens disclosed in JP2009-294527A described above has a five-lens configuration and various kinds of aberration are favorably corrected when Fno is from about 2.4 to about 3.2. However, since the lens has a configuration as if one field flattener is added in a positive-negative-positive-negative four-lens configuration, power to correct spherical aberration and coma aberration is not sufficient when Fno is decreased. Therefore, when the aperture Fno is decreased, it is difficult to improve performance.

A lens disclosed in JP2009-294528A described above also has the configuration as if one field flattener is added in the positive-negative-positive-negative four-lens configuration, as in the lens disclosed in JP2009-294527A described above. Therefore, the lens disclosed in JP2009-294528A is advantageous in improving image-plane characteristics. However, it is difficult to correct spherical aberration and coma aberration that are caused when the aperture Fno is decreased, and therefore, it is difficult to secure performance suitable for a high-pixel-density image pickup device.

A lens disclosed in JP2010-262269A described above has a five-lens configuration and has Fno of about 2.0. In the lens disclosed in JP2010-262269A, favorable performance is secured by correcting various kinds of aberration, in particular, by correcting coma aberration by the third and fourth lenses. However, the second lens has a concave surface that faces toward the object plane and is away from the first lens. Therefore, it is difficult to favorably correct chromatic aberration, which leads to degradation in performance. Further, since the second lens has the concave surface that faces toward the object plane and the third lens has a biconvex shape, it is difficult to correct the Petzval sum when size and total length of the lens is reduced, which leads to degradation in image-plane characteristics.

A lens disclosed in WO2010/024198 described above also has a five-lens configuration, and has Fno of about 2.0. In this lens, the first lens and the second lens are close to each other and chromatic aberration is favorably corrected. Further, coma aberration caused by a decrease in aperture Fno is favorably corrected by the third and fourth lenses. However, in this lens, assembly characteristics are degraded due to strong power in the fourth lens, which leads to degradation in performance of the whole lens system. Moreover, it becomes difficult to correct aberration, in particular, spherical aberration and coma aberration, when size and total length is further reduced or aperture Fno aperture is further decreased.

It is desirable to provide an image pickup lens and an image pickup unit that are compact and have favorable optical performance suitable for a high-pixel-density image pickup device.

According to an embodiment of the present disclosure, there is provided an image pickup lens including: in recited order from object plane toward image plane, a first lens having positive refractive power; a second lens having negative refractive power; a third lens having positive refractive power; a fourth lens having positive or negative refractive power; a fifth lens having positive refractive power; and a sixth lens having negative refractive power and having optical surfaces, one or more of the optical surfaces each having an aspherical shape with one or more inflection points.

According to an embodiment of the present disclosure, there is provided an image pickup unit with an image pickup lens and an image pickup device outputting an image pickup signal based on an optical image formed by the image pickup lens, the image pickup lens including: in recited order from object plane toward image plane, a first lens having positive refractive power; a second lens having negative refractive power; a third lens having positive refractive power; a fourth lens having positive or negative refractive power; a fifth lens having positive refractive power; and a sixth lens having negative refractive power and having optical surfaces, one or more of the optical surfaces each having an aspherical shape with one or more inflection points.

In the image pickup lens and the image pickup unit according to the above embodiments of the present disclosure, the six-lens configuration as a whole is adopted and the configuration of each lens is optimized.

According to the image pickup lens and the image pickup unit of the above embodiments of the present disclosure, the six-lens configuration as a whole is adopted and the configuration of each lens is optimized. Therefore, compact size and favorable optical performance suitable for a high-pixel-density image pickup device are achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
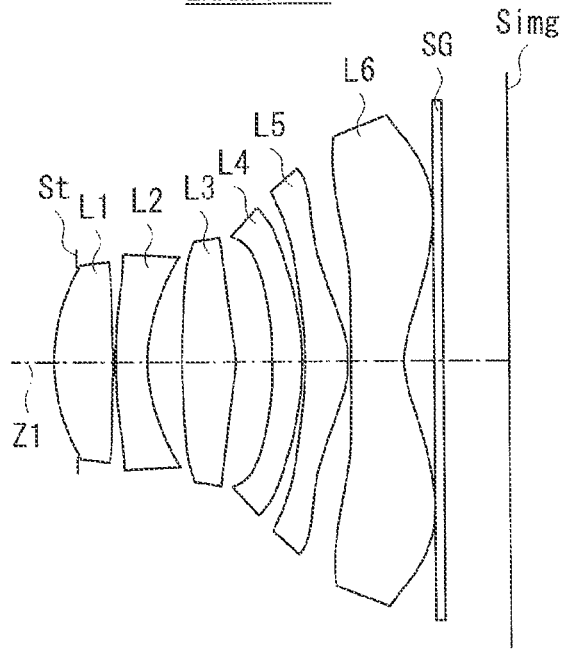
FIG. 1 illustrates a first configuration example of an image pickup lens according to an embodiment of the present disclosure and is a lens cross-sectional view corresponding to Numerical Example 1.

An embodiment of the present disclosure will be described below in detail referring to the drawings. The description will be given in the following order.
1. Basic Configuration of Lenses
2. Functions and Effects
3. Example of Application to Image Pickup Unit
4. Numerical Examples of Lenses
5. Other Embodiments 1. Basic Configuration of Lenses FIG. 1 illustrates a first configuration example of an image pickup lens according to an embodiment of the present disclosure. The first configuration example corresponds to a lens configuration in Numerical Example 1 which will be described later. Similarly, cross-sectional configurations of second to sixteenth configuration examples that correspond to Numerical Examples 2 to 16 which will be described later are shown in FIGS. 2 to 16, respectively. In FIGS. 1 to 16, a symbol Simg represents image plane and Z1 represents an optical axis.

The image pickup lens according to the present embodiment substantially has a six-lens configuration in which a first lens L1, a second lens L2, a third lens L3, a fourth lens L4, a fifth lens L5, and a sixth lens L6 are arranged along the optical axis Z1 in order from object plane.

The first lens L1 has positive refractive power. The second lens L2 has negative refractive power. The third lens L3 has positive refractive power. The fourth lens L4 has positive or negative refractive power. The fifth lens L5 has positive refractive power. The sixth lens L6 has negative refractive power. One or both of an object-sided surface and an image-sided surface of the sixth lens L6 have an aspherical shape that has an inflection point at which a concave-convex shape is varied in a way from a central portion to a peripheral portion thereof, and have one or more inflection points other than an intersection with the optical axis Z1.

The first lens L1 may preferably have a convex surface that faces toward the object plane. The second lens L2 may preferably have a concave surface that faces toward the image plane.

Moreover, the image pickup lens according to the present embodiment may preferably satisfy predetermined conditional expressions etc. which will be described later.

2. Functions and Effects

Next, description will be given of functions and effects of the image pickup lens according to the present embodiment.

In the present image pickup lens, the six-lens configuration as a whole is adopted and the configuration of each lens is optimized. Therefore, compact size and favorable optical performance suitable for a high-pixel-density image pickup device are achieved. In particular, the sixth lens L6 has at least one aspherical surface that has an inflection point. Therefore, light rays are allowed to enter the image pickup device at an appropriate angle. Accordingly, the present image pickup lens is suitable for the high-pixel-density image pickup device.

Moreover, in the present image pickup lens, an image-sided surface of the second lens L2 has a concave shape that has a concave surface facing toward the image plane. Therefore, total reflection ghost caused by an off-axial luminous flux is diffused into a circumferential portion of the lens and the ghost light is prevented from directly entering the solid-state image pickup device such as a CCD and a CMOS, which is effective in correcting coma aberration as well. Further, the third lens L3 to the fifth lens L5 have shapes that have positive combined power, which is effective in correcting aberration, in particular, in correcting image-plane curvature, astigmatism, and coma aberration. Further, since the fourth lens L4 has negative refractive power, ghost light that has entered a circumferential portion of the fourth lens L4 is reflected to an object-sided surface and is prevented from directly entering the solid-state image pickup device such as a CCD and a CMOS. Further, power of the sixth lens L6 is varied to have positive refractive power as going from a paraxial portion to a circumferential portion of the lens, which is effective in correcting the image-plane curvature.

[Description of Conditional Expressions]

In the image pickup lens according to the present embodiment, further favorable performance may be obtained by optimizing the configuration of each lens so as to satisfy at least one, and preferably two or more in combination, of the following conditional expressions.

$$vd1-vd2>20 \quad (1)$$

In the above-described Conditional Expression (1), vd1 is an Abbe number at d-line (having a wavelength of 587.6 nm) of the first lens L1, and vd2 is an Abbe number at d-line of the second lens L2.

Conditional Expression (1) defines the Abbe numbers at the d-line of the first lens L1 and the second lens L2. By forming the first lens L1 and the second lens L2 with the use of a glass material having an Abbe number within the range described in Conditional Expression (1), the chromatic aberration is favorably corrected. Further, occurrence of the coma aberration in the peripheral portion and occurrence of the image-plane curvature are allowed to be suppressed. Considering the aberration correction, the numerical range in Conditional Expression (1) may be preferably set based on the following Conditional Expression (1)'.

$$vd1-vd2>25 \quad (1)'$$

$$0.05<f1/|f2|<1.5 \quad (2)$$

In the above-described Conditional Expression (2), f1 is a focal length of the first lens L1, and f2 is a focal length of the second lens L2.

Conditional Expression (2) relates to appropriate power allocation to the second lens L2 with respect to power of the first lens L1. An absolute value of the focal length of the second lens L2 is used since the second lens L2 has negative power. By configuring the first lens L1 and the second lens L2 to have the power arrangement described in Conditional Expression (2), a favorable aberration correction effect is obtained. If a value of f1/|f2| is larger than the upper limit thereof, the power in the second lens L2 is excessively large. Therefore, it becomes difficult to correct the off-axial aberration, in particular, it becomes difficult to correct the astigmatism and the image-plane curvature, which leads to degradation in assembly characteristics upon manufacturing. Conversely, if the value of f1/|f2| is smaller than the lower limit thereof, the power in the second lens L2 is weak. This causes disadvantages in reducing total length of the lens, which leads to degradation in compactness. This also causes disadvantages in achromatic characteristics. Accordingly, performance suitable for the high-pixel-density image pickup device is not obtained. Considering balance in the achromatic characteristics, more favorable performance may be obtained by allowing the numerical range in Conditional Expression (2) to be set based on the following Conditional Expression (2)'.

$$0.2<f1/|f2|<1.1 \quad (2)'$$

$$0.0<|f2|/(f345)<9.0 \quad (3)$$

In the above-described Conditional Expression (3), f345 is a combined focal length of the third lens L3, the fourth lens L4, and the fifth lens L5.

Conditional Expression (3) relates to appropriate allocation of the combined power of the third lens L3 to the fifth lens L5 with respect to the power of the second lens L2. If a value of |f2|/(f345) in Conditional Expression (3) is larger than the upper limit thereof, the combined power of the third lens L3 to the fifth lens L5 is weak with respect to the power of the second lens L2. Therefore, it becomes difficult to correct the off-axial aberration, in particular, it becomes difficult to correct the coma aberration and the astigmatism. Further, disadvantages may be caused in reducing total length of the lens, which leads to degradation in compactness. Conversely, if the value of |f2|/(f345) in Conditional Expression (3) is smaller than the lower limit thereof, the combined power of the third lens L3 to the fifth lens L5 is excessively large with respect to the power of the second lens L2. Therefore, it becomes difficult to correct the off-axial aberration, in particular, it becomes difficult to correct the astigmatism and the image-plane curvature. Also, the assembly characteristics upon manufacturing may be degraded. Considering these factors, the numerical range in Conditional Expression (3) may more preferably be set based on the following Conditional Expression (3)'.

$$0.0<|f2|/(f345)<6.0 \qquad (3)'$$

$$0.0<f/|f6|<5.0 \qquad (4)$$

In the above-described Conditional Expression (4), f is a total focal length of the image pickup lens, and f6 is a focal length of the sixth lens L6.

Conditional Expression (4) relates to appropriate power allocation of the sixth lens L6 with respect to the power of the whole lens system. An absolute value of the focal length of the sixth lens L6 is used since the sixth lens L6 has negative power. If a value of f/|f6| in Conditional Expression (4) is larger than the upper limit thereof, the power of the sixth lens L6 becomes excessively large. Therefore, it becomes difficult to correct the off-axial aberration, in particular, it becomes difficult to correct the distortion, which leads to degradation in assembly characteristics upon manufacturing. Conversely, if the value of f/|f6| in Conditional Expression (4) is smaller than the lower limit thereof, the power of the sixth lens L6 is weak, and therefore, disadvantages may be caused in reducing total length of the lens, which leads to degradation in compactness. Considering the aberration correction, the numerical range in Conditional Expression (4) may more preferably be set based on the following Conditional Expression (4)'.

$$0.0<f/|f6|<3.5 \qquad (4)'$$

$$|(R9-R10)/(R9+R10)|<1.3 \qquad (5)$$

In the above-described Conditional Expression (5), R9 is a paraxial curvature radius of an object-sided surface of the fifth lens L5, and R10 is a paraxial curvature radius of an image-sided surface of the fifth lens L5.

Conditional Expression (5) is a conditional expression related to a relationship between the paraxial curvature radius of the object-sided surface and that of the image-sided surface of the fifth lens L5. By allowing a value of |(R9−R10)/(R9−R10)| to be within the defined range, the off-axial aberration, in particular, the coma aberration and the image-plane curvature are favorably corrected. Considering this factor, by setting the numerical range in Conditional Expression (5) based on the following Conditional Expression (5)', the image pickup lens becomes more advantageous in correcting aberration.

$$|(R9-R10)/(R9+R10)|<1.1 \qquad (5)'$$

$$|(R7-R8)/(R7+R8)|<0.8 \qquad (6)$$

In the above-described Conditional Expression (6), R7 is a paraxial curvature radius of an object-sided surface of the fourth lens L4, and R8 is a paraxial curvature radius of an image-sided surface of the fourth lens L4.

Conditional Expression (6) relates to a relationship between the paraxial curvature radius of the object-sided surface and that of the image-sided surface of the fourth lens L4. By allowing a value of |(R7−R8)/(R7+R8)| to be within the defined range, the off-axial aberration, in particular, the astigmatism is favorably corrected. Considering this factor, by setting the numerical range in Conditional Expression (6) based on the following Conditional Expression (6)', the image pickup lens becomes more advantageous in correcting aberration.

$$|(R7-R8)/(R7+R8)|<0.6 \qquad (6)'$$

$$0.0<|R12/f6|<1.0 \qquad (7)$$

In the above-described Conditional Expression (7), R12 is a paraxial curvature radius of an image-sided surface of the sixth lens L6.

Conditional Expression (7) defines a value of the refractive power of the sixth lens L6 with respect to the paraxial curvature radius of the image-sided surface of the sixth lens L6. By allowing a value of |R12/f6| to be within the defined range, the aberration, in particular, the distortion and the image-plane curvature are favorably corrected. When the value of |R12/f6| in Conditional Expression (7) is out of the defined range, the distortion and the image-plane curvature become worse, and further, since the refractive power of the sixth lens L6 becomes excessively strong, it may be disadvantageous in that degradation in performance is caused when assembly error occurs.

$$0.0<|R4/f2|<1.3 \qquad (8)$$

In the above-described Conditional Expression (8), R4 is a paraxial curvature radius of an image-sided surface of the second lens L2.

Conditional Expression (8) defines a value of the refractive power of the second lens L2 with respect to the paraxial curvature radius of the image-sided surface of the second lens L2. If the value of |R4/f2| in Conditional Expression (8) is out of the defined range, the aberration, in particular, the image-plane curvature become worse, which leads to degradation in the image-plane characteristics. This causes a disadvantageous effect on achieving high performance suitable for the high-pixel-density image pickup device. When the refractive power of the second lens L2 becomes excessively strong, degradation in performance may be larger when assembly error occurs.

$$0.0<|(R5-R6)/(R5+R6)|<4.0 \qquad (9)$$

In the above-described Conditional Expression (9), R5 is a paraxial curvature radius of an object-sided surface of the third lens L3, and R6 is a paraxial curvature radius of an image-sided surface of the third lens L3.

Conditional Expression (9) relates to a relationship between the paraxial curvature radius of the object-sided surface and that of the image-sided surface of the third lens L3. Allowing a value of |(R5−R6)/(R5+R6)| in Conditional Expression (9) to be within the defined range favorably contributes to the correction of the coma aberration that occurs when the aperture Fno is decreased. If the value of |(R5−R6)/(R5+R6)| is out of this range, the coma aberration is not favorably corrected, and in particular, it becomes difficult to secure performance of the peripheral portion of the screen.

3. Example of Application to Image Pickup Unit

Figure 33:
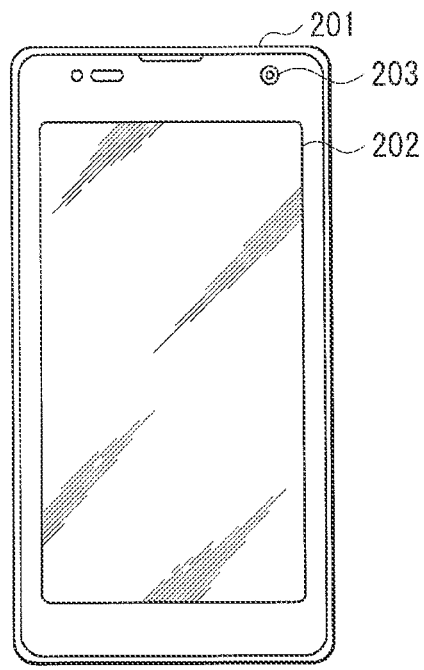
FIG. 33 is a front view illustrating a configuration example of an image pickup unit.
Figure 34:
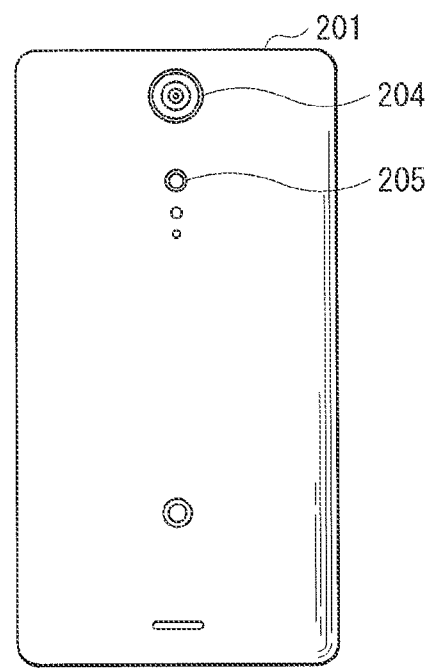
FIG. 34 is a rear view illustrating the configuration example of the image pickup unit.

FIGS. 33 and 34 illustrate a configuration example of an image pickup unit to which the image pickup lens according to the present embodiment is applied. This configuration example is an example of a personal digital assistant (PDA) (such as a mobile information terminal and a mobile phone) that includes the image pickup unit. The PDA includes a substantially-rectangular housing 201. For example, a display section 202, a front camera section 203, and/or the like may be provided on the front face side of the housing 201 (FIG. 33). For example, a main camera section 204, a camera flash 205, and the like may be provided on the rear face side of the housing 201 (FIG. 34).

The display section 202 may be, for example, a touch panel that allows various kinds of operation by detecting a contact state on the surface. Thus, the display section 202 has a function of displaying various kinds of information and an input function that allows various kinds of input operation by a user. The display section 202 may display, for example, an operation state, various kinds of data such as an image taken by the front camera section 203 or the main camera section 204, and/or the like.

The image pickup lens according to the present embodiment may be applicable, for example, as a lens for a camera module in the image pickup unit (the front camera section 203 or the main camera section 204) in the PDA as shown in FIGS. 33 and 34. When the image pickup lens according to the present embodiment is used as such a lens for a camera module, an image pickup device such as a CCD (Charge Coupled Device) and a CMOS (Complementary Metal Oxide Semiconductor) that outputs an image pickup signal (image signal) based on an optical image formed by the image pickup lens is arranged near the image plane Simg of the image pickup lens. In this case, as shown in FIG. 1, for example, seal glass SG for protecting the image pickup device, an optical member such as various optical filters, and/or the like may be arranged between the sixth lens L6 and the image plane Simg as shown in FIG. 1.

It is to be noted that the image pickup lens according to the present embodiment is not limited to the above-described PDA, and is also applicable as an image pickup lens for other electronic units such as a digital still camera and a digital video camera. Moreover, the image pickup lens according to the present embodiment may be applicable to general compact image pickup units that use a solid-state image pickup device such as a CCD and a CMOS, for example, an optical sensor, a mobile module camera, a web camera, and the like.

EXAMPLES

4. Numerical Examples of Lenses

Next, specific numerical examples of the image pickup lens according to the present embodiment will be described. Symbols etc. in the tables and the description below represent the following. "Si" represents the number of an i-th surface where a surface of a most-object-sided component is counted as a 1st surface and numerals are sequentially attached to surfaces of the components so that the numeral becomes larger as the surface of the component become closer to the image plane. It is to be noted that "STO" in the surface number indicates that the surface is an aperture stop surface. "Ri" represents a value (mm) of a paraxial curvature radius of the i-th surface. "Di" represents a value (mm) of a spacing on the optical axis between the i-th surface and the (i+1)th surface. "Ndi" represents a value of a refractive index at the d-line (having a wavelength of 587.6 nm) of a material of an optical component that has the i-th surface. "vdi" represents a value of an Abbe number of the d-line of the material of the optical component that has the i-th surface. Concerning the curvature radius, "∞" indicates that the relevant surface is a planar surface or an aperture stop surface. ω represents a half angle of view, and FNo represents F-number.

In each example, a shape of the aspherical surface is represented by the following expression. In data of aspherical surface coefficients, a symbol "E" indicates that a numerical value following the symbol "E" is an "exponent of a power" having 10 as a base, and that a numerical value represented by an exponential function of 10 as a base is multiplied by a numerical value before "E". To give an example, "1.0E-05" represents "$1.0 \times 10^{-5}$".

[Expression of Aspherical Surface]

$$Z=(Y^2/R)/[1+\{1-(1+K)(Y^2/R^2)\}^{1/2}]+\Sigma A_i \cdot Y^i$$

In the above-described expression, Z is depth of the aspherical surface, Y is height from the optical axis, R is a paraxial curvature radius, K is a conic constant, and Ai is an ith-order aspherical coefficient (i is an integer of 3 or larger).

[Configuration Common to Respective Numerical Examples]

Any of image pickup lenses according to the numerical examples below has a configuration that satisfies the above-described basic configuration of the lenses. Further, in each of the image pickup lenses according to the respective numerical examples, each lens surface in the first lens L1 to the sixth lens L6 is an aspherical surface. The seal glass SG is arranged between the sixth lens L6 and the image plane Simg.

Numerical Example 1

Table 1 and Table 2 each show specific lens data corresponding to the image pickup lens according to the first configuration example shown in FIG. 1. In particular, Table 1 shows basic lens data thereof, and Table 2 shows data related to the aspherical surfaces. Table 1 also shows values of F-number, the diagonal total angle of view 2ω, and the total focal length f.

In this first configuration example, the fourth lens L4 has positive refractive power. The aperture stop St is arranged on the object plane side of the first lens L1.

TABLE 1

| FNo | 2.0 |
| f | 1.3 |
| 2ω | 73.4° |

| Example 1 . lens data | | | | | |
|---|---|---|---|---|---|
| lens | Si surface number | Ri curvature radius | Di spacing | Ndi refractive index | vdi Abbe number |
| | (STO) | ∞ | −0.083 | — | — |
| L1 | 1 | 0.648 | 0.212 | 1.535 | 56.3 |
| | 2 | −2.008 | 0.009 | — | — |
| L2 | 3 | 1.382 | 0.116 | 1.635 | 23.8 |
| | 4 | 0.484 | 0.127 | — | — |
| L3 | 5 | 1.864 | 0.201 | 1.535 | 56.3 |
| | 6 | −21.168 | 0.129 | — | — |
| L4 | 7 | −1.218 | 0.106 | 1.535 | 56.3 |
| | 8 | −0.887 | 0.012 | — | — |
| L5 | 9 | −0.809 | 0.156 | 1.535 | 56.3 |
| | 10 | −0.302 | 0.010 | — | — |
| L6 | 11 | 2.412 | 0.195 | 1.535 | 56.3 |
| | 12 | 0.268 | 0.108 | — | — |
| SG | 13 | ∞ | 0.036 | 1.518 | 64.1 |
| | 14 | ∞ | 0.237 | — | — |

TABLE 2

Example 1 . aspherical surface data

| Si | K | A3 | A4 | A5 | A6 | A7 | A8 | A9 |
|---|---|---|---|---|---|---|---|---|
| 1 | −7.4373E−01 | — | 3.7915E−01 | — | −9.9252E−03 | — | 2.9928E+01 | — |
| 2 | −9.9821E+00 | — | 3.1280E+00 | — | −2.0570E+01 | — | 5.3599E+01 | — |
| 3 | −6.3398E+00 | −1.3844E−01 | −5.7698E−02 | 1.6968E+00 | 8.5734E+00 | −1.5470E+01 | −1.5423E+02 | 4.3836E−01 |
| 4 | −7.6597E+00 | 1.1943E−01 | 1.8882E+00 | −1.2099E−01 | 1.9248E+00 | −6.1483E+00 | −6.4345E+01 | 6.0521E−01 |
| 5 | −9.0832E+00 | 4.9804E−02 | −1.6519E+00 | 6.1173E−01 | 4.8416E+00 | −4.1863E+00 | 1.8518E+00 | 2.1624E+01 |
| 6 | −1.0000E+01 | −2.1459E−01 | 6.9998E−02 | −3.6437E+00 | −2.3586E+00 | 5.3197E+00 | 4.6057E+00 | −1.0876E+01 |
| 7 | 6.6769E+00 | −3.8186E−01 | 1.5681E+00 | 8.5897E−01 | −3.1917E+00 | −1.3269E+00 | −5.0802E+00 | −5.0414E+00 |
| 8 | 0.0000E+00 | 7.3483E−01 | −2.4001E+00 | 2.2164E+00 | 3.3269E+00 | 7.5198E−01 | −1.1250E+00 | −3.5490E+00 |
| 9 | 0.0000E+00 | 1.3329E+00 | −4.1781E−01 | −2.4341E+00 | 2.2101E+00 | 4.1332E+00 | −7.3712E+00 | −1.8858E+01 |
| 10 | −4.8502E+00 | −1.3860E−01 | 1.4347E+00 | −3.4694E−01 | 1.3786E+00 | −2.3064E+00 | −2.6757E+00 | 1.4555E+00 |
| 11 | 5.3579E+00 | −3.8625E−01 | −1.7795E+00 | 7.6785E−01 | 2.9201E+00 | 4.5206E−01 | −1.6735E−01 | −1.0065E+00 |
| 12 | −4.6751E+00 | −1.4069E+00 | 2.2708E+00 | −1.8088E+00 | −4.2004E−01 | 7.8327E−01 | 5.8905E−02 | 1.6394E−01 |

| Si | A10 | A11 | A12 | A13 | A14 | A15 | A16 | A17 |
|---|---|---|---|---|---|---|---|---|
| 1 | −1.9891E+02 | — | — | — | — | — | — | — |
| 2 | −1.9399E+02 | — | — | — | — | — | — | — |
| 3 | 5.4523E+02 | — | — | — | — | — | — | — |
| 4 | 3.2246E+02 | — | — | — | — | — | — | — |
| 5 | 8.0758E+01 | — | — | — | — | — | — | — |
| 6 | −1.9202E+01 | −6.5142E+01 | 5.2973E+01 | 5.1727E+02 | 1.8365E+03 | 3.0394E+03 | 1.9657E+03 | −2.1705E+04 |
| 7 | −5.8534E+00 | 1.5818E+01 | 1.2322E+02 | — | — | — | — | — |
| 8 | −2.8142E+01 | — | — | — | — | — | — | — |
| 9 | 3.2033E+01 | — | — | — | — | — | — | — |
| 10 | −1.2390E+00 | 2.3699E+00 | −2.8119E+00 | — | — | — | — | — |
| 11 | −2.5113E+00 | −1.7300E+00 | −1.0424E+00 | 5.7571E−01 | 4.7234E+00 | — | — | — |
| 12 | −3.2233E−01 | −9.9138E−01 | −3.1047E−01 | 2.5164E−01 | 1.4878E+00 | — | — | — |

Numerical Example 2

Figure 2:
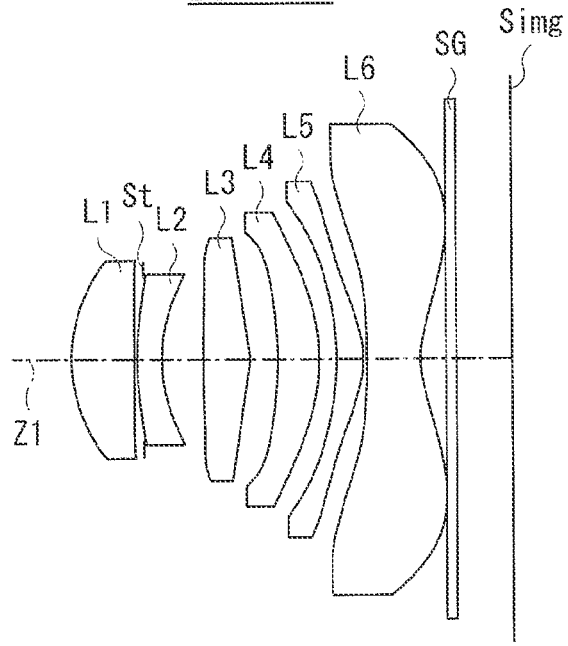
FIG. 2 illustrates a second configuration example of the image pickup lens and is a lens cross-sectional view corresponding to Numerical Example 2.

Table 3 and Table 4 each show specific lens data corresponding to the image pickup lens according to the second configuration example shown in FIG. 2. In particular, Table 3 shows basic lens data thereof, and Table 4 shows data related to the aspherical surfaces. Table 3 also shows values of F-number, the diagonal total angle of view 2ω, and the total focal length f.

In this second configuration example, the fourth lens L4 has positive refractive power. The aperture stop St is arranged between the first lens L1 and the second lens L2.

TABLE 3

| FNo | 1.9 |
|---|---|
| f | 1.3 |
| 2ω | 74.0° |

TABLE 3-continued

Example 2. lens data

| lens | Si surface number | Ri curvature radius | Di spacing | Ndi refractive index | vdi Abbe number |
|---|---|---|---|---|---|
| L1 | 1 | 0.564 | 0.227 | 1.535 | 56.3 |
|  | 2 | −3.417 | 0.030 | — | — |
|  | (STO) | ∞ | −0.020 | — | — |
| L2 | 3 | 1.270 | 0.089 | 1.652 | 21.6 |
|  | 4 | 0.515 | 0.150 | — | — |
| L3 | 5 | 3.062 | 0.177 | 1.535 | 56.3 |
|  | 6 | −21.546 | 0.093 | — | — |
| L4 | 7 | −1.268 | 0.153 | 1.535 | 56.3 |
|  | 8 | −0.602 | 0.063 | — | — |
| L5 | 9 | −0.684 | 0.095 | 1.535 | 56.3 |
|  | 10 | −0.313 | 0.013 | — | — |
| L6 | 11 | −4.351 | 0.195 | 1.535 | 56.3 |
|  | 12 | 0.302 | 0.093 | — | — |
| SG | 13 | ∞ | 0.036 | 1.518 | 64.1 |
|  | 14 | ∞ | 0.194 | — | — |

TABLE 4

Example 2 . aspherical surface data

| Si | K | A3 | A4 | A5 | A6 | A7 | A8 | A9 |
|---|---|---|---|---|---|---|---|---|
| 1 | 0.0000E+00 | — | 6.8169E−01 | — | 6.6441E−01 | — | 1.5483E+01 | — |
| 2 | −9.9821E+00 | — | 2.7175E+00 | — | −1.8033E+01 | — | 1.0571E+02 | — |
| 3 | −6.3398E+00 | −1.1879E−01 | −2.7430E−01 | 1.1748E+00 | 9.9787E+00 | −3.7323E+00 | −1.1881E+02 | 1.9631E+01 |
| 4 | −7.6597E+00 | 1.1958E−01 | 2.0171E+00 | 3.5301E−01 | 3.3287E+00 | 1.8852E−01 | −4.0814E+01 | 4.0501E+01 |
| 5 | −9.0832E+00 | 8.8589E−02 | −1.7446E+00 | −1.4740E−01 | 3.2681E+00 | −5.6737E+00 | 3.3029E+00 | 3.2302E+01 |
| 6 | −1.0000E+01 | −1.2315E−01 | 2.5773E−01 | −3.6507E+00 | −2.7132E+00 | 3.5304E+00 | −1.1376E+00 | −2.4318E+01 |
| 7 | 6.6769E+00 | 1.4649E−01 | 1.1353E+00 | −8.8302E−02 | −3.0469E+00 | 6.7593E−01 | −5.4095E+00 | −1.9762E+01 |
| 8 | 0.0000E+00 | 9.6323E−01 | −2.5216E+00 | 2.7675E+00 | 3.5857E+00 | 6.1812E−01 | 4.1318E−01 | 3.6193E+00 |
| 9 | 0.0000E+00 | 1.1166E+00 | −4.8675E−01 | −2.6578E+00 | 2.5749E+00 | 5.2038E+00 | −6.0186E+00 | −1.7889E+01 |
| 10 | −4.8502E+00 | 2.3422E−01 | 6.1877E−01 | −9.2735E−01 | 1.3440E+00 | −1.8854E+00 | −1.9218E+00 | 2.4038E+00 |
| 11 | 5.3579E+00 | −8.9453E−02 | −1.7511E+00 | 7.7496E−01 | 2.9147E+00 | 4.4880E−01 | −1.6866E−01 | −1.0043E+00 |
| 12 | −4.6751E+00 | −1.6600E+00 | 2.7901E+00 | −1.9374E+00 | −7.1221E−01 | 5.9371E−01 | 8.7746E−04 | 1.9779E−01 |

TABLE 4-continued

Example 2. aspherical surface data

| | A10 | A11 | A12 | A13 | A14 | A15 | A16 | A17 |
|---|---|---|---|---|---|---|---|---|
| 1 | 2.3416E+01 | — | — | — | — | — | — | — |
| 2 | −4.0266E+02 | — | — | — | — | — | — | — |
| 3 | 1.1340E+02 | — | — | — | — | — | — | — |
| 4 | 9.2405E+01 | — | — | — | — | — | — | — |
| 5 | 1.1217E+02 | — | — | — | — | — | — | — |
| 6 | −4.2986E+01 | −9.3354E+01 | 4.9231E+01 | 6.1716E+02 | 2.1724E+03 | 3.6435E+03 | 2.2244E+03 | −2.5513E+04 |
| 7 | −4.5879E+01 | −8.9356E+00 | 3.5176E+02 | — | — | — | — | — |
| 8 | −9.6461E+00 | — | — | — | — | — | — | — |
| 9 | 3.1540E+01 | — | — | — | — | — | — | — |
| 10 | −3.4921E−01 | 2.7215E+00 | −3.8459E+00 | — | — | — | — | — |
| 11 | −2.4970E+00 | −1.6887E+00 | −9.6030E−01 | 7.0123E−01 | 4.8713E+00 | — | — | — |
| 12 | −2.3075E−01 | −8.6662E−01 | −1.8625E−01 | 3.2025E−01 | 1.4270E+00 | — | — | — |

Numerical Example 3

Figure 3:
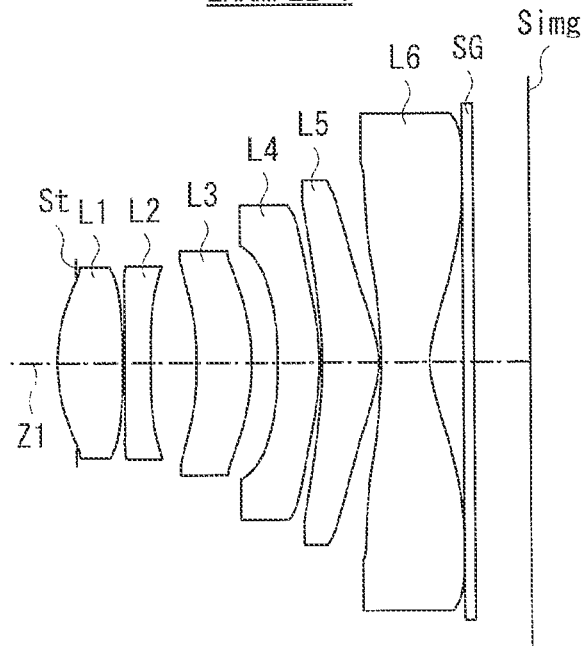
FIG. 3 illustrates a third configuration example of the image pickup lens and is a lens cross-sectional view corresponding to Numerical Example 3.

Table 5 and Table 6 each show specific lens data corresponding to the image pickup lens according to the third configuration example shown in FIG. 3. In particular, Table 5 shows basic lens data thereof, and Table 6 shows data related to the aspherical surfaces. Table 5 also shows values of F-number, the diagonal total angle of view $2\omega$, and the total focal length f.

In this third configuration example, the fourth lens L4 has positive refractive power. The aperture stop St is arranged on the object plane side of the first lens L1.

TABLE 5

| FNo | 2.3 |
|---|---|
| f | 1.4 |
| $2\omega$ | 69.0° |

TABLE 5-continued

Example 3. lens data

| lens | Si surface number | Ri curvature radius | Di spacing | Ndi refractive index | vdi Abbe number |
|---|---|---|---|---|---|
| | (STO) | ∞ | −0.066 | — | — |
| L1 | 1 | 0.605 | 0.237 | 1.535 | 56.3 |
| | 2 | −1.780 | 0.007 | — | — |
| L2 | 3 | −3.968 | 0.089 | 1.652 | 21.6 |
| | 4 | 2.362 | 0.170 | — | — |
| L3 | 5 | −0.953 | 0.198 | 1.535 | 56.3 |
| | 6 | −0.801 | 0.097 | — | — |
| L4 | 7 | −1.141 | 0.147 | 1.535 | 56.3 |
| | 8 | −0.742 | 0.012 | — | — |
| L5 | 9 | −0.845 | 0.201 | 1.535 | 56.3 |
| | 10 | −0.325 | 0.010 | — | — |
| L6 | 11 | −1.813 | 0.179 | 1.535 | 56.3 |
| | 12 | 0.299 | 0.123 | — | — |
| SG | 13 | ∞ | 0.036 | 1.518 | 64.1 |
| | 14 | ∞ | 0.201 | — | — |

TABLE 6

Example 3 · aspherical surface data

| Si | K | A3 | A4 | A5 | A6 | A7 | A8 | A9 |
|---|---|---|---|---|---|---|---|---|
| 1 | −7.4373E−01 | — | −1.8503E−02 | — | −4.0512E+00 | — | 3.1216E+01 | — |
| 2 | −9.9821E+00 | — | 7.3887E−01 | — | −2.0513E+01 | — | 6.8314E+01 | — |
| 3 | −6.3398E+00 | 1.2548E−01 | 8.8981E−01 | 1.5138E+00 | 5.4980E+00 | −1.6226E+01 | −1.2572E+02 | 1.0298E+02 |
| 4 | −7.6597E+00 | 1.1510E−01 | 7.1386E−01 | 6.9671E−01 | 9.3950E+00 | 6.9084E+00 | −6.6811E+01 | −7.1550E+01 |
| 5 | −9.0832E+00 | −1.7373E−02 | −1.5267E+00 | 1.4735E+00 | 3.8598E+00 | −4.7129E+00 | 6.5131E+00 | 3.7113E+01 |
| 6 | −1.0000E+01 | −4.0698E−01 | 1.5716E−01 | −3.3350E+00 | 2.9397E+00 | 1.3184E+01 | 8.4100E+00 | −2.2334E+01 |
| 7 | 6.6769E+00 | −2.0487E−01 | 6.9128E−01 | 1.9412E+00 | −5.6502E+00 | −3.8928E+00 | −1.8056E+00 | 9.9732E+00 |
| 8 | 0.0000E+00 | 1.2552E+00 | −2.2354E+00 | 2.2019E+00 | 3.7789E+00 | −2.3258E−02 | −2.2151E+00 | −2.2665E+00 |
| 9 | 0.0000E+00 | 1.2152E+00 | −3.5056E+00 | −2.2850E+00 | 2.6949E+00 | 5.0954E+00 | −6.5820E+00 | −6.5820E+00 |
| 10 | −4.8502E+00 | 7.1029E−01 | −9.7555E−02 | −1.2572E+00 | 1.5494E+00 | −1.5905E+00 | −1.5657E+00 | 2.8511E+00 |
| 11 | 5.3579E+00 | 2.9326E−01 | −1.1528E+00 | 9.5470E−01 | 2.6882E+00 | 4.6371E−02 | −7.3742E−01 | −1.6028E+00 |
| 12 | −4.6751E+00 | −1.5105E+00 | 2.5687E+00 | −1.5692E+00 | −1.6546E−01 | −2.4356E−02 | −5.2110E−01 | 7.0181E−01 |

| | A10 | A11 | A12 | A13 | A14 | A15 | A16 | A17 |
|---|---|---|---|---|---|---|---|---|
| 1 | −6.4394E+02 | — | — | — | — | — | — | — |
| 2 | −4.0179E+02 | — | — | — | — | — | — | — |
| 3 | 4.7754E+02 | — | — | — | — | — | — | — |
| 4 | 2.1495E+02 | — | — | — | — | — | — | — |
| 5 | 1.0536E+02 | — | — | — | — | — | — | — |
| 6 | −5.7733E+01 | −1.2659E+02 | 2.8853E+01 | 7.3665E+02 | 2.7662E+03 | 5.3220E+03 | 5.5958E+03 | −2.3575E+04 |
| 7 | 1.9173E+01 | 1.2351E+01 | −1.4569E+02 | — | — | — | — | — |
| 8 | −2.1406E+01 | — | — | — | — | — | — | — |
| 9 | −6.5820E+00 | 2.8900E+01 | — | — | — | — | — | — |
| 10 | 7.2665E−02 | 2.6699E+00 | −5.4332E+00 | — | — | — | — | — |
| 11 | −2.9096E+00 | −1.6151E+00 | −8.0529E−02 | 2.4553E+00 | 7.2290E+00 | — | — | — |
| 12 | 7.3178E−01 | 1.6716E−01 | 2.0058E−01 | −4.0736E−01 | −8.7093E−01 | — | — | — |

Numerical Example 4

Figure 4:
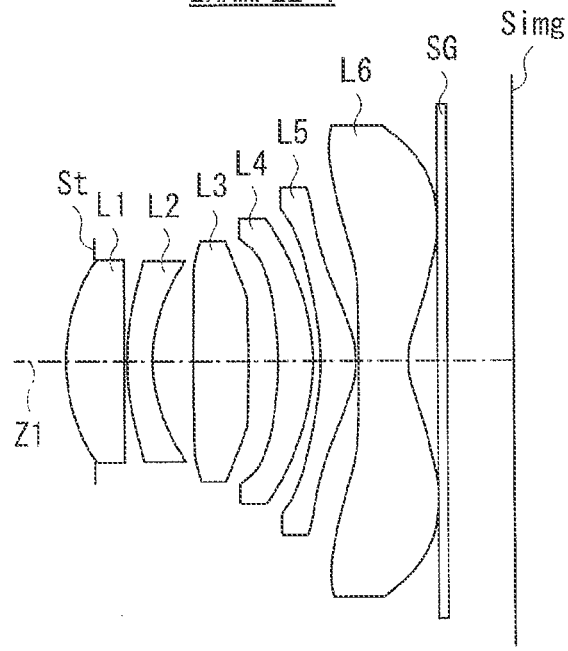
FIG. 4 illustrates a fourth configuration example of the image pickup lens and is a lens cross-sectional view corresponding to Numerical Example 4.

Table 7 and Table 8 each show specific lens data corresponding to the image pickup lens according to the fourth configuration example shown in FIG. 4. In particular, Table 7 shows basic lens data thereof, and Table 8 shows data related to the aspherical surfaces. Table 7 also shows values of F-number, the diagonal total angle of view $2\omega$, and the total focal length f.

In this fourth configuration example, the fourth lens L4 has positive refractive power. The aperture stop St is arranged on the object plane side of the first lens L1.

Numerical Example 5

Figure 5:
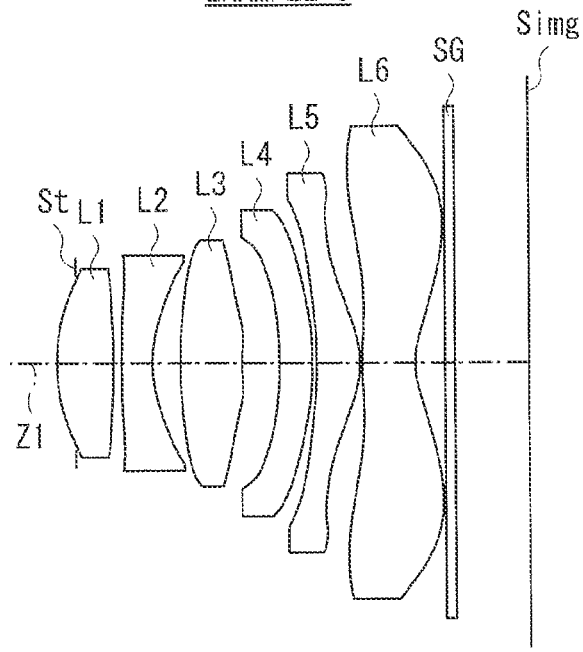
FIG. 5 illustrates a fifth configuration example of the image pickup lens and is a lens cross-sectional view corresponding to Numerical Example 5.

Table 9 and Table 10 each show specific lens data corresponding to the image pickup lens according to the fifth configuration example shown in FIG. 5. In particular, Table 9 shows basic lens data thereof, and Table 10 shows data related to the aspherical surfaces. Table 9 also shows values of F-number, the diagonal total angle of view $2\omega$, and the total focal length f.

In this fifth configuration example, the fourth lens L4 has positive refractive power. The aperture stop St is arranged on the object plane side of the first lens L1.

TABLE 7

| | FNo | | 1.7 | |
|---|---|---|---|---|
| | f | | 1.3 | |
| | $2\omega$ | | 75.2° | |

| | Example 4. lens data | | | | |
|---|---|---|---|---|---|
| lens | Si surface number | Ri curvature radius | Di spacing | Ndi refractive index | vdi Abbe number |
| | (STO) | ∞ | −0.106 | — | — |
| L1 | 1 | 0.639 | 0.213 | 1.535 | 56.3 |
| | 2 | −3.229 | 0.007 | — | — |
| L2 | 3 | 0.875 | 0.089 | 1.680 | 18.0 |
| | 4 | 0.478 | 0.148 | — | — |
| L3 | 5 | 4.338 | 0.199 | 1.535 | 56.3 |
| | 6 | −8.548 | 0.104 | — | — |
| L4 | 7 | −1.211 | 0.124 | 1.535 | 56.3 |
| | 8 | −0.650 | 0.029 | — | — |
| L5 | 9 | −0.588 | 0.126 | 1.535 | 56.3 |
| | 10 | −0.278 | 0.007 | — | — |
| L6 | 11 | 2.037 | 0.179 | 1.535 | 56.3 |
| | 12 | 0.250 | 0.105 | — | — |
| SG | 13 | ∞ | 0.036 | 1.518 | 64.1 |
| | 14 | ∞ | 0.237 | — | — |

TABLE 9

| | FNo | | 2.1 | |
|---|---|---|---|---|
| | f | | 1.4 | |
| | $2\omega$ | | 71.5° | |

| | Example 5. lens data | | | | |
|---|---|---|---|---|---|
| lens | Si surface number | Ri curvature radius | Di spacing | Ndi refractive index | vdi Abbe number |
| | (STO) | ∞ | −0.070 | — | — |
| L1 | 1 | 0.663 | 0.203 | 1.535 | 56.3 |
| | 2 | −1.419 | 0.029 | — | — |
| L2 | 3 | 2.513 | 0.112 | 1.608 | 28.1 |
| | 4 | 0.448 | 0.101 | — | — |
| L3 | 5 | 1.206 | 0.225 | 1.535 | 56.3 |
| | 6 | −14.301 | 0.133 | — | — |
| L4 | 7 | −1.229 | 0.118 | 1.535 | 56.3 |
| | 8 | −0.919 | 0.019 | — | — |
| L5 | 9 | −0.823 | 0.152 | 1.535 | 56.3 |
| | 10 | −0.301 | 0.010 | — | — |
| L6 | 11 | 2.611 | 0.189 | 1.535 | 56.3 |
| | 12 | 0.272 | 0.107 | — | — |
| SG | 13 | ∞ | 0.036 | 1.518 | 64.1 |
| | 14 | ∞ | 0.266 | — | — |

TABLE 8

| Example 4 · aspherical surface data | | | | | | | | |
|---|---|---|---|---|---|---|---|---|
| Si | K | A3 | A4 | A5 | A6 | A7 | A8 | A9 |
| 1 | −7.4373E−01 | — | 3.8282E−01 | — | −3.0285E−01 | — | 2.1299E+01 | — |
| 2 | −9.9821E+00 | — | 2.6529E+00 | — | −1.8935E+01 | — | 7.2754E+01 | — |
| 3 | −6.3398E+00 | −1.1323E−01 | 1.6413E−01 | 1.8617E+00 | 9.1396E+00 | −1.0943E+01 | −1.3596E+02 | 2.5034E+01 |
| 4 | −7.6597E+00 | 2.2659E−01 | 2.1208E+00 | −1.1384E−01 | 2.2601E+00 | −3.5255E+00 | −5.9854E+01 | −9.9007E+00 |
| 5 | −9.8028E+00 | 7.2713E−02 | −1.6466E+00 | 1.5647E−01 | 3.5801E+00 | −5.7749E+00 | 2.9613E+00 | 3.4762E+01 |
| 6 | −1.0000E+01 | −1.6979E−01 | 1.2735E−01 | −3.7824E+00 | −3.0787E+00 | 3.4894E+00 | 5.9966E−01 | −1.8681E+01 |
| 7 | 6.6507E+00 | −8.6581E−02 | 1.3444E+00 | −2.4652E−01 | −4.0277E+00 | −7.2280E−01 | −5.0539E+00 | −1.4221E+01 |
| 8 | −2.8735E−03 | 1.0712E+00 | −2.5214E+00 | 2.3734E+00 | 2.2562E+00 | −1.7072E+00 | −1.7354E+00 | 4.2339E+00 |
| 9 | −2.5374E−03 | 1.6300E+00 | −1.4773E−01 | −2.6652E+00 | 2.4798E+00 | 4.9789E+00 | −6.2781E+00 | −1.7490E+01 |
| 10 | −4.8032E+00 | −2.9307E−01 | 1.5953E+00 | −5.1309E−01 | 1.2284E+00 | −2.2021E+00 | −2.2402E+00 | 2.1268E+00 |
| 11 | 5.3277E+00 | −6.7679E−01 | −1.7707E+00 | 8.6188E−01 | 3.0241E+00 | 5.4195E−01 | −1.1517E−01 | −1.0004E+00 |
| 12 | −4.6821E+00 | −1.5305E+00 | 2.5801E+00 | −2.1857E+00 | −3.8125E−01 | 9.5552E−01 | 1.1411E−01 | 1.1996E−01 |

| Si | A10 | A11 | A12 | A13 | A14 | A15 | A16 | A17 |
|---|---|---|---|---|---|---|---|---|
| 1 | −1.1607E+02 | — | — | — | — | — | — | — |
| 2 | −2.0569E+02 | — | — | — | — | — | — | — |
| 3 | 3.3986E+02 | — | — | — | — | — | — | — |
| 4 | 2.5211E+02 | — | — | — | — | — | — | — |
| 5 | 1.3568E+02 | — | — | — | — | — | — | — |
| 6 | −3.3252E+01 | −8.8018E+01 | 2.0889E+01 | 4.8433E+02 | 1.8328E+03 | 3.1454E+03 | 2.1931E+03 | −2.2133E+04 |
| 7 | −3.6744E+01 | −1.0387E+01 | 3.0104E+02 | — | — | — | — | — |
| 8 | −8.9514E−01 | — | — | — | — | — | — | — |
| 9 | 3.5083E+01 | 1.8600E−01 | −6.1162E−01 | — | — | — | — | — |
| 10 | −5.7835E−01 | 2.5280E+00 | −3.9609E+00 | — | — | — | — | — |
| 11 | −2.5706E+00 | −1.8742E+00 | −1.2852E+00 | 2.2853E−01 | 4.2746E+00 | — | — | — |
| 12 | −3.8447E−01 | −1.0286E+00 | −3.4171E−01 | 1.4097E−01 | 1.1898E+00 | — | — | — |

TABLE 10

Example 5 · aspherical surface data

| Si | K | A3 | A4 | A5 | A6 | A7 | A8 | A9 |
|---|---|---|---|---|---|---|---|---|
| 1 | −7.4373E−01 | — | 3.7290E−01 | — | −9.2670E−02 | — | 2.8295E+01 | — |
| 2 | −9.9821E+00 | — | 3.2123E+00 | — | −2.0178E+01 | — | 5.9676E+01 | — |
| 3 | −6.3398E+00 | −1.7649E−01 | −5.8011E−02 | 1.8101E+00 | 8.7561E+00 | −1.5643E+01 | −1.5586E+02 | −3.5744E+00 |
| 4 | −7.6597E+00 | 1.1287E−01 | 1.8621E+00 | −1.8623E−01 | 1.8545E+00 | −6.0503E+00 | −6.4014E+01 | −1.3912E+00 |
| 5 | −9.0832E+00 | 2.3446E−03 | −1.5736E+00 | 8.5287E−01 | 5.2806E+00 | −3.6897E+00 | 1.4892E+00 | 1.6741E+01 |
| 6 | −1.0000E+01 | −2.1434E−01 | −1.0353E−01 | −3.7818E+00 | −2.3361E+00 | 5.5689E+00 | 4.9841E+00 | −1.0919E+01 |
| 7 | 6.6769E+00 | −4.0457E−01 | 1.5764E+00 | 8.9795E−01 | −3.0754E+00 | −1.2145E+00 | −5.4593E+00 | −6.9798E+00 |
| 8 | 0.0000E+00 | 7.7565E−01 | −2.3529E+00 | 2.3769E+00 | 3.5368E+00 | 8.8814E−01 | −1.3345E+00 | −4.9126E+00 |
| 9 | 0.0000E+00 | 1.3220E+00 | −3.4740E+00 | −2.3860E+00 | 2.2772E+00 | 4.1546E+00 | −7.5124E+00 | −1.9298E+01 |
| 10 | −4.8502E+00 | −9.0265E−02 | 1.4727E+00 | −2.9480E−01 | 1.4219E+00 | −2.2815E+00 | −2.6639E+00 | 1.4692E+00 |
| 11 | 5.3579E+00 | −3.4984E−01 | −1.7541E+00 | 7.8290E−01 | 2.9361E+00 | 4.7065E−01 | −1.4798E−01 | −9.8992E−01 |
| 12 | −4.6751E+00 | −1.4382E+00 | 2.2234E+00 | −1.8251E+00 | −4.1723E−01 | 7.8576E−01 | 5.3511E−02 | 1.5525E−01 |

| Si | A10 | A11 | A12 | A13 | A14 | A15 | A16 | A17 |
|---|---|---|---|---|---|---|---|---|
| 1 | −1.7582E+02 | — | — | — | — | — | — | — |
| 2 | −2.1237E+02 | — | — | — | — | — | — | — |
| 3 | 5.4616E+02 | — | — | — | — | — | — | — |
| 4 | 2.9866E+02 | — | — | — | — | — | — | — |
| 5 | 5.9102E+01 | — | — | — | — | — | — | — |
| 6 | −2.1235E+01 | −7.2510E+01 | 3.4989E+01 | 4.8552E+02 | 1.8107E+03 | 3.1386E+03 | 2.6527E+03 | −1.8889E+04 |
| 7 | −9.8275E+00 | 1.7118E+01 | 1.7364E+02 | — | — | — | — | — |
| 8 | −3.2713E+01 | — | — | — | — | — | — | — |
| 9 | 3.1137E+01 | — | — | — | — | — | — | — |
| 10 | −1.1924E+00 | 2.5107E+00 | −2.4607E+00 | — | — | — | — | — |
| 11 | −2.5028E+00 | −1.7375E+00 | −1.0781E+00 | 4.9352E−01 | 4.5673E+00 | — | — | — |
| 12 | −3.2304E−01 | −9.7143E−01 | −2.5723E−01 | 3.4942E−01 | 1.6402E+00 | — | — | — |

Numerical Example 6

Figure 6:
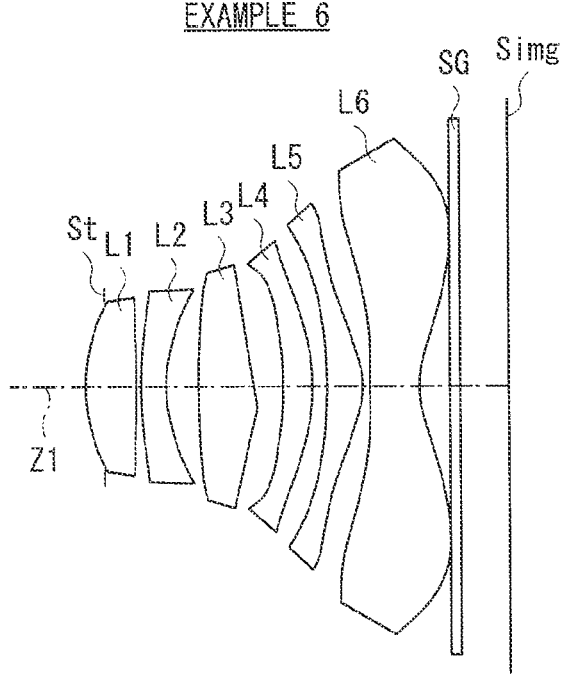
FIG. 6 illustrates a sixth configuration example of the image pickup lens and is a lens cross-sectional view corresponding to Numerical Example 6.

Table 11 and Table 12 each show specific lens data corresponding to the image pickup lens according to the sixth configuration example shown in FIG. 6. In particular, Table 11 shows basic lens data thereof, and Table 12 shows data related to the aspherical surfaces. Table 11 also shows values of F-number, the diagonal total angle of view $2\omega$, and the total focal length f.

In this sixth configuration example, the fourth lens L4 has positive refractive power. The aperture stop St is arranged on the object plane side of the first lens L1.

TABLE 11

| FNo | 2.0 |
|---|---|
| f | 1.5 |
| 2ω | 79.0° |

TABLE 11-continued

Example 6. lens data

| lens | Si surface number | Ri curvature radius | Di spacing | Ndi refractive index | νdi Abbe number |
|---|---|---|---|---|---|
|  | (STO) | ∞ | −0.066 | — | — |
| L1 | 1 | 0.620 | 0.180 | 1.535 | 56.3 |
|  | 2 | −2.484 | 0.018 | — | — |
| L2 | 3 | 1.260 | 0.090 | 1.652 | 21.6 |
|  | 4 | 0.502 | 0.117 | — | — |
| L3 | 5 | 1.973 | 0.212 | 1.535 | 56.3 |
|  | 6 | 41.186 | 0.092 | — | — |
| L4 | 7 | −1.189 | 0.107 | 1.535 | 56.3 |
|  | 8 | −0.597 | 0.054 | — | — |
| L5 | 9 | −0.854 | 0.125 | 1.535 | 56.3 |
|  | 10 | −0.292 | 0.030 | — | — |
| L6 | 11 | −4.183 | 0.174 | 1.535 | 56.3 |
|  | 12 | 0.264 | 0.112 | — | — |
| SG | 13 | ∞ | 0.036 | 1.518 | 64.1 |
|  | 14 | ∞ | 0.175 | — | — |

TABLE 12

Example 6 · aspherical surface data

| Si | K | A3 | A4 | A5 | A6 | A7 | A8 | A9 |
|---|---|---|---|---|---|---|---|---|
| 1 | −7.4373E−01 | — | 4.2332E−01 | — | 8.9744E−01 | — | 9.4480E+00 | — |
| 2 | −9.9821E+00 | — | 2.8634E+00 | — | −2.2343E+01 | — | 8.6566E+01 | — |
| 3 | −6.3398E+00 | −1.4506E−01 | −1.4019E−01 | 1.5497E+00 | 8.0726E+00 | −1.7487E+01 | −1.5711E+02 | 1.3729E+01 |
| 4 | −7.6597E+00 | 6.3760E−02 | 1.9999E+00 | 4.2194E−01 | 2.3325E+00 | −7.9312E+00 | −7.1320E+01 | −4.9943E+00 |
| 5 | −9.0832E+00 | 1.4198E−02 | −1.5997E+00 | 5.5887E−01 | 4.9993E+00 | −2.6508E+00 | 6.0815E+00 | 2.5094E+01 |
| 6 | −1.0000E+01 | −2.4185E−01 | 2.9322E−01 | −3.9395E+00 | −3.7786E+00 | 1.7093E+00 | −3.1325E+00 | −2.5757E+01 |
| 7 | 6.6769E+00 | −5.1567E−02 | 1.6689E+00 | 6.5770E−01 | −3.2866E+00 | −2.4985E+00 | −1.3623E+00 | −3.3745E+01 |
| 8 | 0.0000E+00 | 1.0674E+00 | −2.3649E+00 | 3.0434E+00 | 3.9074E+00 | 8.5262E−01 | 1.6783E−01 | 2.0858E+00 |
| 9 | 0.0000E+00 | 1.2497E+00 | −6.9721E−01 | −3.1198E+00 | 2.0188E+00 | 4.6965E+00 | −6.1487E+00 | −1.7170E+01 |
| 10 | −4.8502E+00 | 8.3517E−02 | 1.0234E+00 | −7.6522E−01 | 1.3381E+00 | −1.9514E+00 | −2.0165E+00 | 2.2405E+00 |
| 11 | 5.3579E+00 | −5.5780E−02 | −1.6561E+00 | 7.7114E−01 | 2.8864E+00 | 4.0718E−01 | −2.1953E−01 | −1.0621E+00 |
| 12 | −4.6751E+00 | −1.4722E+00 | 2.4479E+00 | −1.7969E+00 | −4.2592E−01 | 7.6701E−01 | 5.7639E−04 | 6.3202E−02 |

TABLE 12-continued

Example 6 · aspherical surface data

| | A10 | A11 | A12 | A13 | A14 | A15 | A16 | A17 |
|---|---|---|---|---|---|---|---|---|
| 1 | −9.3362E+01 | — | — | — | — | — | — | — |
| 2 | −2.2381E+02 | — | — | — | — | — | — | — |
| 3 | 6.5316E+02 | — | — | — | — | — | — | — |
| 4 | 3.7659E+02 | — | — | — | — | — | — | — |
| 5 | 5.0301E+01 | — | — | — | — | — | — | — |
| 6 | −4.4622E+01 | −1.0167E+02 | 1.6394E+01 | 5.3209E+02 | 2.0483E+03 | 3.7766E+03 | 4.0387E+03 | −1.6241E+04 |
| 7 | −5.9099E+01 | 1.6447E+01 | 5.7642E+02 | — | — | — | — | — |
| 8 | −1.3853E+01 | — | — | — | — | — | — | — |
| 9 | 3.3650E+01 | — | — | — | — | — | — | — |
| 10 | −6.8023E−01 | 2.0132E+00 | −5.3431E+00 | — | — | — | — | — |
| 11 | −2.5562E+00 | −1.7407E+00 | −9.9003E−01 | 7.1972E−01 | 4.9796E+00 | — | — | — |
| 12 | −4.3534E−01 | −1.0761E+00 | −3.4047E−01 | 2.8266E−01 | 1.5638E+00 | — | — | — |

Numerical Example 7

Figure 7:
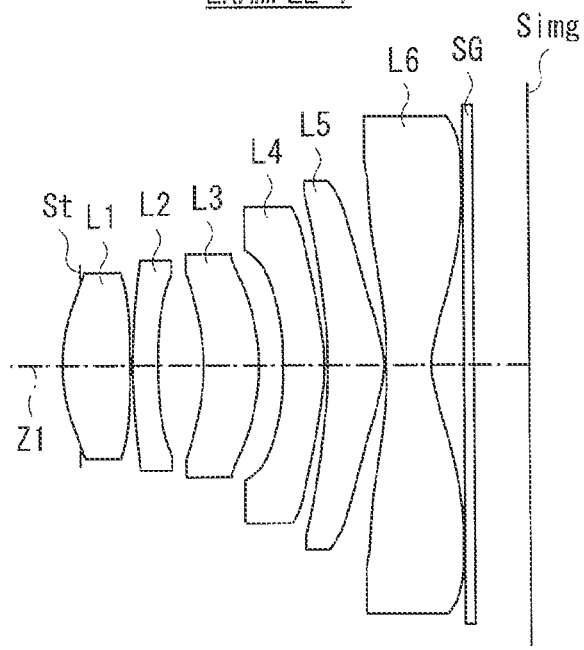
FIG. 7 illustrates a seventh configuration example of the image pickup lens and is a lens cross-sectional view corresponding to Numerical Example 7.

Table 13 and Table 14 each show specific lens data corresponding to the image pickup lens according to the seventh configuration example shown in FIG. 7. In particular, Table 13 shows basic lens data thereof, and Table 14 shows data related to the aspherical surfaces. Table 13 also shows values of F-number, the diagonal total angle of view 2ω, and the total focal length f.

In this seventh configuration example, the fourth lens L4 has positive refractive power. The aperture stop St is arranged on the object plane side of the first lens L1.

TABLE 13

| FNo | 2.3 |
|---|---|
| f | 1.4 |
| 2ω | 69.5° |

TABLE 13-continued

Example 7. lens data

| lens | Si surface number | Ri curvature radius | Di spacing | Ndi refractive index | νdi Abbe number |
|---|---|---|---|---|---|
| | (STO) | ∞ | −0.066 | — | — |
| L1 | 1 | 0.610 | 0.248 | 1.535 | 56.3 |
| | 2 | −3.613 | 0.012 | — | — |
| L2 | 3 | 7.231 | 0.089 | 1.740 | 14.0 |
| | 4 | 1.938 | 0.169 | — | — |
| L3 | 5 | −0.869 | 0.205 | 1.535 | 56.3 |
| | 6 | −0.746 | 0.088 | — | — |
| L4 | 7 | −1.146 | 0.148 | 1.535 | 56.3 |
| | 8 | −0.739 | 0.016 | — | — |
| L5 | 9 | −0.868 | 0.204 | 1.535 | 56.3 |
| | 10 | −0.330 | 0.010 | — | — |
| L6 | 11 | −1.856 | 0.165 | 1.535 | 56.3 |
| | 12 | 0.305 | 0.120 | — | — |
| SG | 13 | ∞ | 0.036 | 1.518 | 64.1 |
| | 14 | ∞ | 0.201 | — | — |

TABLE 14

Example 7 · aspherical surface data

| Si | K | A3 | A4 | A5 | A6 | A7 | A8 | A9 |
|---|---|---|---|---|---|---|---|---|
| 1 | −7.4373E−01 | — | −2.0369E−02 | — | −4.4656E+00 | — | 3.3931E+01 | — |
| 2 | −9.9821E+00 | — | 3.2240E−01 | — | −2.0305E+01 | — | 5.8004E+01 | — |
| 3 | −6.3398E+00 | 1.3492E−01 | 9.0147E−01 | 1.0867E+00 | 4.5697E+00 | −1.6171E+01 | −1.2111E+02 | 1.0390E+02 |
| 4 | −7.6597E+00 | 1.6891E−01 | 8.9533E−01 | 1.2995E+00 | 9.9760E+00 | 4.8576E+00 | −7.8397E+01 | −9.7972E+01 |
| 5 | −9.0832E+00 | −5.2703E−02 | −1.6206E+00 | 1.1709E+00 | 3.7570E+00 | −3.5663E+00 | 9.8836E+00 | 3.7779E+01 |
| 6 | −1.0000E+01 | −5.1931E−01 | 1.2529E−01 | −2.9455E+00 | 3.3172E+00 | 1.2123E+01 | 3.2011E+00 | −3.5294E+01 |
| 7 | 6.6769E+00 | −2.4255E−01 | 8.5494E−01 | 1.8474E+00 | −6.3650E+00 | −4.7681E+00 | −6.2424E−01 | 1.7832E+01 |
| 8 | 0.0000E+00 | 1.3124E+00 | −2.4690E+00 | 1.9950E+00 | 3.9387E+00 | 4.8767E−01 | −1.4739E+00 | −1.3618E+00 |
| 9 | 0.0000E+00 | 1.1947E+00 | −3.4187E+00 | −2.3068E+00 | 2.6325E+00 | 5.0005E+00 | −6.7211E+00 | −1.9498E+01 |
| 10 | −4.8502E+00 | 8.3111E−01 | −3.2045E−01 | −1.2600E+00 | 1.6776E+00 | −1.4995E+00 | −1.5997E+00 | 2.6548E+00 |
| 11 | 5.3579E+00 | 2.7434E−01 | −1.1764E+00 | 9.1202E−01 | 2.6249E+00 | −1.2464E−02 | −7.3723E−01 | −1.4706E+00 |
| 12 | −4.6751E+00 | −1.5496E+00 | 2.5966E+00 | −1.5479E+00 | −8.4594E−02 | 2.4984E−03 | −6.7605E−01 | 3.8900E−01 |

| | A10 | A11 | A12 | A13 | A14 | A15 | A16 | A17 |
|---|---|---|---|---|---|---|---|---|
| 1 | −5.2512E+02 | — | — | — | — | — | — | — |
| 2 | −2.8623E+02 | — | — | — | — | — | — | — |
| 3 | 3.4909E+02 | — | — | — | — | — | — | — |
| 4 | 2.3615E+02 | — | — | — | — | — | — | — |
| 5 | 6.4175E+01 | — | — | — | — | — | — | — |
| 6 | −8.0085E+01 | −1.4903E+02 | 4.5853E+01 | 8.9526E+02 | 3.2320E+03 | 6.0693E+03 | 5.0830E+03 | −3.3892E+04 |
| 7 | 3.6953E+01 | 1.6660E+01 | −3.1360E+02 | — | — | — | — | — |
| 8 | −2.0407E+01 | — | — | — | — | — | — | — |
| 9 | 2.8420E+01 | — | — | — | — | — | — | — |
| 10 | −3.0060E−01 | 2.1032E+00 | −6.2251E+00 | — | — | — | — | — |
| 11 | −2.5843E+00 | −1.1025E+00 | 3.9989E−01 | 2.1365E+00 | 4.5532E+00 | — | — | — |
| 12 | 5.5262E−01 | 4.1310E−01 | 8.5029E−01 | −1.8176E−01 | −1.4857E+00 | — | — | — |

Numerical Example 8

Figure 8:
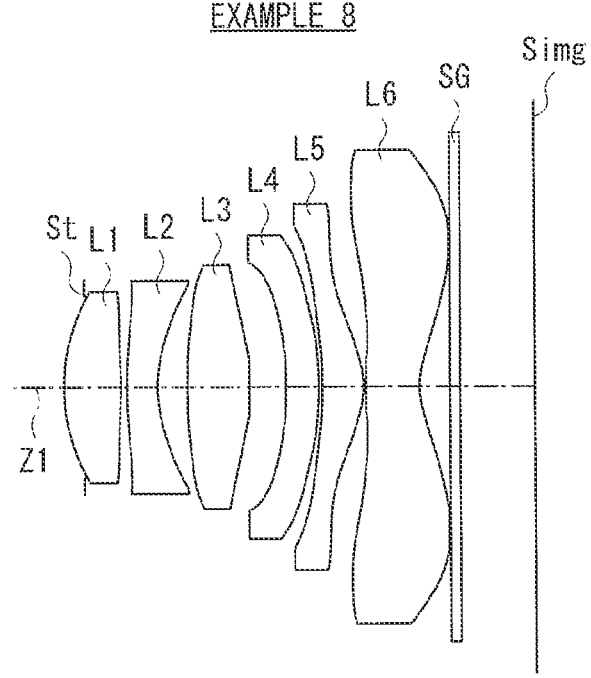
FIG. 8 illustrates an eighth configuration example of the image pickup lens and is a lens cross-sectional view corresponding to Numerical Example 8.

Table 15 and Table 16 each show specific lens data corresponding to the image pickup lens according to the eighth configuration example shown in FIG. 8. In particular, Table 15 shows basic lens data thereof, and Table 16 shows data related to the aspherical surfaces. Table 15 also shows values of F-number, the diagonal total angle of view $2\omega$, and the total focal length f.

In this eighth configuration example, the fourth lens L4 has positive refractive power. The aperture stop St is arranged on the object plane side of the first lens L1.

Numerical Example 9

Figure 9:
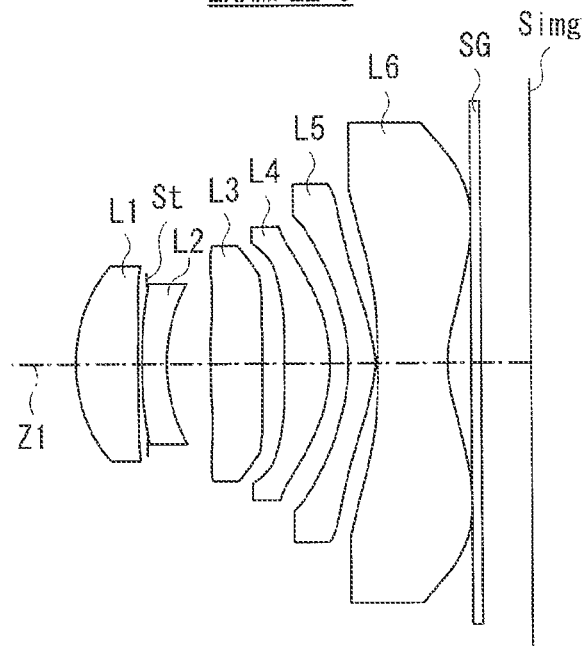
FIG. 9 illustrates a ninth configuration example of the image pickup lens and is a lens cross-sectional view corresponding to Numerical Example 9.

Table 17 and Table 18 each show specific lens data corresponding to the image pickup lens according to the ninth configuration example shown in FIG. 9. In particular, Table 17 shows basic lens data thereof, and Table 18 shows data related to the aspherical surfaces. Table 17 also shows values of F-number, the diagonal total angle of view $2\omega$, and the total focal length f.

In this ninth configuration example, the fourth lens L4 has positive refractive power. The aperture stop St is arranged between the first lens L1 and the second lens L2.

TABLE 15

| | FNo | 2.1 |
|---|---|---|
| | f | 1.3 |
| | $2\omega$ | 72.8° |

Example 8. lens data

| lens | Si surface number | Ri curvature radius | Di spacing | Ndi refractive index | vdi Abbe number |
|---|---|---|---|---|---|
| | (STO) | ∞ | −0.076 | — | — |
| L1 | 1 | 0.660 | 0.204 | 1.535 | 56.3 |
| | 2 | −1.775 | 0.022 | — | — |
| L2 | 3 | 1.791 | 0.107 | 1.609 | 25.9 |
| | 4 | 0.471 | 0.108 | — | — |
| L3 | 5 | 1.436 | 0.219 | 1.535 | 56.3 |
| | 6 | −14.716 | 0.134 | — | — |
| L4 | 7 | −1.225 | 0.117 | 1.535 | 56.3 |
| | 8 | −0.913 | 0.012 | — | — |
| L5 | 9 | −0.833 | 0.146 | 1.535 | 56.3 |
| | 10 | −0.303 | 0.010 | — | — |
| L6 | 11 | 2.575 | 0.191 | 1.535 | 56.3 |
| | 12 | 0.272 | 0.107 | — | — |
| SG | 13 | ∞ | 0.036 | 1.518 | 64.1 |
| | 14 | ∞ | 0.261 | — | — |

TABLE 17

| | FNo | 2.1 |
|---|---|---|
| | f | 1.4 |
| | $2\omega$ | 71.7° |

Example 9. lens data

| lens | Si surface number | Ri curvature radius | Di spacing | Ndi refractive index | vdi Abbe number |
|---|---|---|---|---|---|
| L1 | 1 | 0.564 | 0.228 | 1.535 | 56.3 |
| | 2 | −3.822 | 0.031 | — | — |
| | (STO) | ∞ | −0.020 | — | — |
| L2 | 3 | 1.346 | 0.090 | 1.652 | 21.6 |
| | 4 | 0.536 | 0.161 | — | — |
| L3 | 5 | 2.472 | 0.187 | 1.535 | 56.3 |
| | 6 | 4.508 | 0.084 | — | — |
| L4 | 7 | −1.953 | 0.160 | 1.535 | 56.3 |
| | 8 | −0.579 | 0.068 | — | — |
| L5 | 9 | −0.557 | 0.097 | 1.535 | 56.3 |
| | 10 | −0.372 | 0.010 | — | — |
| L6 | 11 | −4.688 | 0.253 | 1.535 | 56.3 |
| | 12 | 0.380 | 0.089 | — | — |
| SG | 13 | ∞ | 0.036 | 1.518 | 64.1 |
| | 14 | ∞ | 0.178 | — | — |

TABLE 16

Example 8 · aspherical surface data

| Si | K | A3 | A4 | A5 | A6 | A7 | A8 | A9 |
|---|---|---|---|---|---|---|---|---|
| 1 | −7.4373E−01 | — | 3.7809E−01 | — | −7.9121E−02 | — | 2.8686E+01 | — |
| 2 | −9.9821E+00 | — | 3.1754E+00 | — | −2.0097E+01 | — | 6.0563E+01 | — |
| 3 | −6.3398E+00 | −1.6364E−01 | −5.3591E−02 | 1.7747E+00 | 8.6250E+00 | −1.5953E+01 | −1.5643E+02 | −4.3647E+00 |
| 4 | −7.6597E+00 | 1.1626E−01 | 1.8670E+00 | −1.8084E−01 | 1.8455E+00 | −6.1337E+00 | −6.4339E+01 | −2.2897E+00 |
| 5 | −9.0832E+00 | 2.2173E−02 | −1.5712E+00 | 8.2622E−01 | 5.2148E+00 | −3.7823E+00 | 1.4752E+00 | 1.7209E+01 |
| 6 | −1.0000E+01 | −2.2348E−01 | −1.0025E−01 | −3.7903E+00 | −2.3609E+00 | 5.5501E+00 | 5.0454E+00 | −1.0615E+01 |
| 7 | 6.6769E+00 | −3.9473E−01 | 1.5708E+00 | 8.8948E−01 | −3.0620E+00 | −1.1343E+00 | −5.2519E+00 | −6.6407E+00 |
| 8 | 0.0000E+00 | 7.5374E−01 | −2.3449E+00 | 2.3927E+00 | 3.5444E+00 | 8.8721E−01 | −1.3034E+00 | −4.7303E+00 |
| 9 | 0.0000E+00 | 1.3337E+00 | −4.0175E−01 | −2.4311E+00 | 2.2578E+00 | 4.1668E+00 | −7.4618E+00 | −1.9199E+01 |
| 10 | −4.8502E+00 | −9.5397E−02 | 1.4740E+00 | −2.9797E−01 | 1.4133E+00 | −2.2943E+00 | −2.6812E+00 | 1.4449E+00 |
| 11 | 5.3579E+00 | −3.4992E−01 | −1.7623E+00 | 7.7852E−01 | 2.9340E+00 | 4.6969E−01 | −1.4826E−01 | −9.8963E−01 |
| 12 | −4.6751E+00 | −1.4072E+00 | 2.2490E+00 | −1.8049E+00 | −4.0339E−01 | 7.9185E−01 | 5.1140E−02 | 1.4426E−01 |

| | A10 | A11 | A12 | A13 | A14 | A15 | A16 | A17 |
|---|---|---|---|---|---|---|---|---|
| 1 | −1.6836E+02 | — | — | — | — | — | — | — |
| 2 | −2.0719E+02 | — | — | — | — | — | — | — |
| 3 | 5.4525E+02 | — | — | — | — | — | — | — |
| 4 | 2.9699E+02 | — | — | — | — | — | — | — |
| 5 | 6.1307E+01 | — | — | — | — | — | — | — |
| 6 | −2.0416E+01 | −7.0894E+01 | 3.7145E+01 | 4.8549E+02 | 1.7976E+03 | 3.0770E+03 | 2.4407E+03 | −1.9529E+04 |
| 7 | −9.7234E+00 | 1.5150E+01 | 1.6285E+02 | — | — | — | — | — |
| 8 | −3.2126E+01 | — | — | — | — | — | — | — |
| 9 | 3.1304E+01 | — | — | — | — | — | — | — |
| 10 | −1.2285E+00 | 2.4538E+00 | −2.5535E+00 | — | — | — | — | — |
| 11 | −2.5017E+00 | −1.7349E+00 | −1.0729E+00 | 5.0344E−01 | 4.5849E+00 | — | — | — |
| 12 | −3.4255E−01 | −9.9925E−01 | −2.9321E−01 | 3.0528E−01 | 1.5877E+00 | — | — | — |

TABLE 18

Example 9 · aspherical surface data

| Si | K | A3 | A4 | A5 | A6 | A7 | A8 | A9 |
|---|---|---|---|---|---|---|---|---|
| 1 | −7.4373E−01 | — | 7.4327E−01 | — | 2.1013E+00 | — | 1.0735E+00 | — |
| 2 | −9.9821E+00 | — | 2.8525E+00 | — | −1.7401E+01 | — | 1.1756E+02 | — |
| 3 | −6.3398E+00 | −7.9925E−02 | −3.4107E−01 | 1.1141E+00 | 1.0843E+01 | 1.3071E−01 | −1.1105E+02 | 8.8241E+00 |
| 4 | −7.6597E+00 | 3.2476E−02 | 2.0176E+00 | −7.4745E−02 | 3.2155E+00 | 4.6614E+00 | −2.2299E+01 | 6.4877E+01 |
| 5 | −9.0832E+00 | −4.3952E−02 | −1.7014E+00 | −1.1301E−01 | 1.8597E+00 | −9.4178E+00 | −2.6355E+00 | 3.2717E+01 |
| 6 | −1.0000E+01 | −1.6197E−01 | −1.1609E−01 | −3.8450E+00 | −1.2957E+00 | 4.6298E+00 | −5.2335E+00 | −4.3705E+01 |
| 7 | 6.6769E+00 | 5.8028E−02 | −1.6150E−01 | −6.5696E−02 | −1.9692E+00 | 3.7245E+00 | −5.0263E+00 | −3.8027E+01 |
| 8 | 0.0000E+00 | 6.1426E−01 | −2.6783E+00 | 2.8596E+00 | 4.3066E+00 | 1.6029E+00 | 1.9213E+00 | 7.1334E+00 |
| 9 | 0.0000E+00 | 1.0842E+00 | −2.6159E−01 | −2.3457E+00 | 2.9790E+00 | 6.9685E+00 | −2.6659E+00 | −1.4228E+01 |
| 10 | −4.8502E+00 | 4.4283E−01 | 1.3385E−01 | −9.3661E−01 | 1.8783E+00 | −1.2804E+00 | −1.4430E+00 | 2.5788E+00 |
| 11 | 5.3579E+00 | −4.5193E−02 | −1.7291E+00 | 7.6903E−01 | 2.9051E+00 | 4.4990E−01 | −1.6195E−01 | −9.9678E−01 |
| 12 | −4.6751E+00 | −1.5230E+00 | 2.6048E+00 | −1.9113E+00 | −5.7396E−01 | 6.6818E−01 | −2.2646E−02 | 1.2407E−01 |

| Si | A10 | A11 | A12 | A13 | A14 | A15 | A16 | A17 |
|---|---|---|---|---|---|---|---|---|
| 1 | 1.2338E+02 | — | — | — | — | — | — | — |
| 2 | −5.1627E+02 | — | — | — | — | — | — | — |
| 3 | −5.2845E+01 | — | — | — | — | — | — | — |
| 4 | −5.4971E+01 | — | — | — | — | — | — | — |
| 5 | 1.7418E+02 | — | — | — | — | — | — | — |
| 6 | −9.7284E+01 | −2.1546E+02 | −1.8264E+02 | 2.6145E+02 | 1.8291E+03 | 3.9893E+03 | 4.9502E+03 | −1.6793E+04 |
| 7 | −1.1350E+02 | −1.6833E+02 | 6.6364E+01 | — | — | — | — | — |
| 8 | −3.7182E−01 | — | — | — | — | — | — | — |
| 9 | 3.2622E+01 | — | — | — | — | — | — | — |
| 10 | −8.1764E−01 | 9.7771E−01 | −7.9192E+00 | — | — | — | — | — |
| 11 | −2.4904E+00 | −1.6782E+00 | −9.4824E−01 | 7.0418E−01 | 4.8183E+00 | — | — | — |
| 12 | −2.9047E−01 | −8.7349E−01 | −1.4661E−01 | 3.6035E−01 | 1.3862E+00 | — | — | — |

Numerical Example 10

Figure 10:
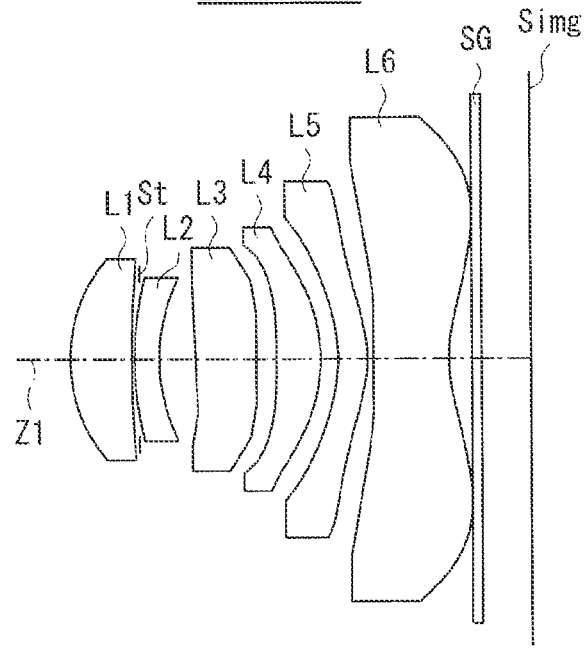
FIG. 10 illustrates a tenth configuration example of the image pickup lens and is a lens cross-sectional view corresponding to Numerical Example 10.

Table 19 and Table 20 each show specific lens data corresponding to the image pickup lens according to the tenth configuration example shown in FIG. 10. In particular, Table 19 shows basic lens data thereof, and Table 20 shows data related to the aspherical surfaces. Table 19 also shows values of F-number, the diagonal total angle of view $2\omega$, and the total focal length f.

In this tenth configuration example, the fourth lens L4 has positive refractive power. The aperture stop St is arranged between the first lens L1 and the second lens L2.

TABLE 19

| FNo | 2.1 |
|---|---|
| f | 1.4 |
| 2ω | 71.8° |

TABLE 19-continued

Example 10. lens data

| lens | Si surface number | Ri curvature radius | Di spacing | Ndi refractive index | vdi Abbe number |
|---|---|---|---|---|---|
| L1 | 1 | 0.571 | 0.222 | 1.535 | 56.3 |
|  | 2 | −11.882 | 0.027 | — | — |
|  | (STO) | ∞ | −0.020 | — | — |
| L2 | 3 | 1.027 | 0.089 | 1.650 | 16.7 |
|  | 4 | 0.562 | 0.143 | — | — |
| L3 | 5 | −46.244 | 0.208 | 1.535 | 56.3 |
|  | 6 | −5.073 | 0.073 | — | — |
| L4 | 7 | −1.598 | 0.155 | 1.535 | 56.3 |
|  | 8 | −0.593 | 0.063 | — | — |
| L5 | 9 | −0.521 | 0.105 | 1.535 | 56.3 |
|  | 10 | −0.423 | 0.030 | — | — |
| L6 | 11 | −59.988 | 0.263 | 1.535 | 56.3 |
|  | 12 | 0.421 | 0.084 | — | — |
| SG | 13 | ∞ | 0.036 | 1.518 | 64.1 |
|  | 14 | ∞ | 0.174 | — | — |

TABLE 20

Example 10 · aspherical surface data

| Si | K | A3 | A4 | A5 | A6 | A7 | A8 | A9 |
|---|---|---|---|---|---|---|---|---|
| 1 | −7.4373E−01 | — | 7.0082E−01 | — | 2.8157E+00 | — | 1.3053E+00 | — |
| 2 | −9.9821E+00 | — | 2.5268E+00 | — | −1.6012E+01 | — | 1.2168E+02 | — |
| 3 | −6.3398E+00 | −2.5018E−02 | −1.3446E−02 | 1.1532E+00 | 9.6559E+00 | −3.3906E+00 | −1.1464E+02 | 1.8671E+01 |
| 4 | −7.6597E+00 | 7.4485E−02 | 1.8182E+00 | −7.2204E−01 | 2.6211E+00 | 5.2509E+00 | −1.9843E+01 | 5.8207E+01 |
| 5 | −9.0832E+00 | −3.6231E−02 | −2.0493E+00 | −6.1865E−02 | 6.0651E−01 | −1.2963E+01 | −7.9068E+00 | 3.4117E+01 |
| 6 | −1.0000E+01 | −2.5461E−01 | −7.2146E−03 | −4.9538E+00 | −1.7672E+00 | 4.6908E+00 | −5.5665E+00 | −4.6485E+01 |
| 7 | 6.6769E+00 | 1.6699E−02 | −8.6337E−01 | 9.6780E−01 | −2.8426E+00 | −3.2132E−01 | −1.2377E+01 | −4.5555E+01 |
| 8 | 0.0000E+00 | 3.8477E−01 | −2.5073E+00 | 2.5264E+00 | 4.5354E+00 | 2.2445E+00 | 2.7936E+00 | 8.0668E+00 |
| 9 | 0.0000E+00 | 1.0523E+00 | −2.5995E−01 | −1.7053E+00 | 3.5647E+00 | 7.7260E+00 | −1.5883E+00 | −1.3537E+01 |
| 10 | −4.8502E+00 | 6.1092E−01 | 1.2930E−01 | −1.1935E+00 | 1.8415E+00 | −1.2197E+00 | −1.3874E+00 | 2.5626E+00 |
| 11 | 5.3579E+00 | −1.0112E−01 | −1.7310E+00 | 7.5772E−01 | 2.8671E+00 | 3.9619E−01 | −2.2727E−01 | −1.0697E+00 |
| 12 | −4.6751E+00 | −1.4443E+00 | 2.4806E+00 | −1.9123E+00 | −5.2410E−01 | 7.0014E−01 | −1.0697E−02 | 1.3229E−01 |

TABLE 20-continued

| | Example 10 · aspherical surface data | | | | | | | |
|---|---|---|---|---|---|---|---|---|
| | A10 | A11 | A12 | A13 | A14 | A15 | A16 | A17 |
| 1 | 1.0204E+02 | — | — | — | — | — | — | — |
| 2 | −6.1990E+02 | — | — | — | — | — | — | — |
| 3 | −3.1040E+01 | — | — | — | — | — | — | — |
| 4 | −1.5546E+02 | — | — | — | — | — | — | — |
| 5 | 2.1844E+02 | — | — | — | — | — | — | — |
| 6 | −1.0546E+02 | −2.3093E+02 | −1.9891E+02 | 2.8054E+02 | 2.0025E+03 | 4.6569E+03 | 7.0044E+03 | −1.0957E+04 |
| 7 | −1.1071E+02 | −1.3167E+02 | 1.7587E+02 | — | — | — | — | — |
| 8 | 4.7809E−01 | — | — | — | — | — | — | — |
| 9 | 2.9963E+01 | — | — | — | — | — | — | — |
| 10 | −9.9875E−01 | 4.8445E−01 | −8.9996E+00 | — | — | — | — | — |
| 11 | −2.5603E+00 | −1.7241E+00 | −9.3341E−01 | 8.4373E−01 | 5.1873E+00 | — | — | — |
| 12 | −2.8083E−01 | −8.6954E−01 | −1.6264E−01 | 3.0118E−01 | 1.2580E+00 | — | — | — |

Numerical Example 11

Figure 11:
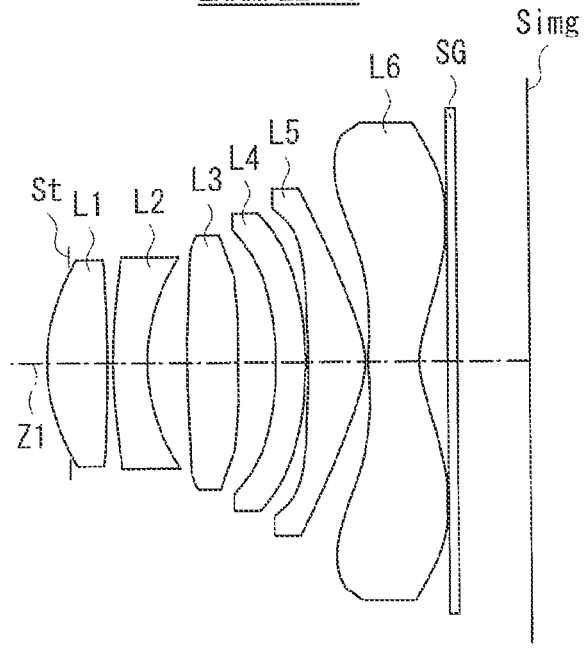
FIG. 11 illustrates an eleventh configuration example of the image pickup lens and is a lens cross-sectional view corresponding to Numerical Example 11.

Table 21 and Table 22 each show specific lens data corresponding to the image pickup lens according to the eleventh configuration example shown in FIG. 11. In particular, Table 21 shows basic lens data thereof, and Table 22 shows data related to the aspherical surfaces. Table 21 also shows values of F-number, the diagonal total angle of view $2\omega$, and the total focal length f.

In this eleventh configuration example, the fourth lens L4 has negative refractive power. The aperture stop St is arranged on the object plane side of the first lens L1.

TABLE 21

| FNo | 2.0 |
|---|---|
| f | 1.4 |
| 2ω | 68.9° |

TABLE 21-continued

| | | Example 11. lens data | | | | |
|---|---|---|---|---|---|---|
| lens | | Si surface number | Ri curvature radius | Di spacing | Ndi refractive index | νdi Abbe number |
| | (STO) | | ∞ | −0.083 | — | — |
| L1 | | 1 | 0.650 | 0.221 | 1.535 | 56.3 |
| | | 2 | −2.904 | 0.025 | — | — |
| L2 | | 3 | 2.127 | 0.126 | 1.636 | 23.8 |
| | | 4 | 0.609 | 0.148 | — | — |
| L3 | | 5 | 1.916 | 0.187 | 1.535 | 56.3 |
| | | 6 | 6.381 | 0.140 | — | — |
| L4 | | 7 | −1.411 | 0.109 | 1.636 | 23.8 |
| | | 8 | −1.562 | 0.010 | — | — |
| L5 | | 9 | −2.069 | 0.209 | 1.535 | 56.3 |
| | | 10 | −0.337 | 0.017 | — | — |
| L6 | | 11 | 2.156 | 0.185 | 1.535 | 56.3 |
| | | 12 | 0.277 | 0.103 | — | — |
| SG | | 13 | ∞ | 0.036 | 1.518 | 64.1 |
| | | 14 | ∞ | 0.271 | — | — |

TABLE 22

| | Example 11 · aspherical surface data | | | | | | | |
|---|---|---|---|---|---|---|---|---|
| Si | K | A3 | A4 | A5 | A6 | A7 | A8 | A9 |
| 1 | −7.4373E−01 | — | 3.6254E−01 | — | −2.1809E+00 | — | 3.9462E+01 | — |
| 2 | −9.9821E+00 | — | 1.7710E+00 | — | −8.2262E+00 | — | 2.9144E−01 | — |
| 3 | −6.3398E+00 | −7.4596E−03 | 1.6240E−01 | 4.5732E−01 | 8.8835E+00 | −8.5262E−01 | −1.2670E+02 | −3.3210E+01 |
| 4 | −7.6597E+00 | 4.8005E−02 | 1.6931E+00 | −5.8760E−02 | 4.8539E+00 | 1.7523E−01 | −5.5881E+01 | −6.7586E−01 |
| 5 | −9.0832E+00 | 3.0421E−02 | −2.0897E+00 | 7.5054E−01 | 4.5322E+00 | −5.4719E+00 | −5.0264E+00 | 9.8269E+00 |
| 6 | −1.0000E+01 | −1.7069E−01 | −9.3252E−01 | −2.6700E+00 | −1.6398E+00 | 3.2750E+00 | 5.3016E+00 | 3.0389E+00 |
| 7 | 6.6769E+00 | −3.6434E−01 | 1.2557E−01 | 7.2083E−01 | −4.6426E+00 | −1.1661E+00 | 1.9703E+00 | 1.7822E+01 |
| 8 | 0.0000E+00 | −1.7798E−01 | −5.8333E−01 | −5.7084E−02 | 1.0698E+00 | −2.3261E−01 | −2.2637E+00 | −2.3246E+00 |
| 9 | 0.0000E+00 | 5.4430E−01 | −1.0397E−01 | −5.5296E−01 | −2.0259E+00 | −9.0032E−01 | −4.4009E+00 | −2.3814E+00 |
| 10 | −4.8502E+00 | −1.7804E−02 | 1.5444E−01 | −2.7315E−01 | 2.1794E+00 | −2.4613E+00 | −3.7081E+00 | 6.1483E−02 |
| 11 | 5.3579E+00 | −1.0675E+00 | −1.1736E+00 | 8.0364E−01 | 2.7544E+00 | 2.8456E−01 | −1.4035E−01 | −6.9048E−01 |
| 12 | −4.6751E+00 | −1.1905E+00 | 1.0230E+00 | 3.4468E−02 | −5.6728E−01 | −4.7612E−02 | −3.7579E−01 | 2.9755E−01 |

| | A10 | A11 | A12 | A13 | A14 | A15 | A16 | A17 |
|---|---|---|---|---|---|---|---|---|
| 1 | −2.3109E+02 | — | — | — | — | — | — | — |
| 2 | −8.2187E+01 | — | — | — | — | — | — | — |
| 3 | 4.2448E+02 | — | — | — | — | — | — | — |
| 4 | 2.0493E+02 | — | — | — | — | — | — | — |
| 5 | 1.1098E+02 | — | — | — | — | — | — | — |
| 6 | 1.7379E+01 | −3.4054E+01 | −3.0107E+01 | −1.8661E+01 | 3.8196E+02 | 8.8147E+02 | 1.8465E+03 | −1.8489E+03 |
| 7 | 3.4911E+01 | 1.3489E+01 | −1.6703E+02 | — | — | — | — | — |
| 8 | 4.8401E−01 | — | — | — | — | — | — | — |
| 9 | −8.5641E+00 | — | — | — | — | — | — | — |
| 10 | −1.2510E+00 | 6.4389E+00 | 9.1273E+00 | — | — | — | — | — |
| 11 | −1.9381E+00 | −1.0293E+00 | −5.2669E−01 | 1.6132E−01 | 2.3366E+00 | — | — | — |
| 12 | 2.6930E−01 | −3.5632E−01 | 3.9562E−02 | −3.2249E−03 | 5.3185E−01 | — | — | — |

Numerical Example 12

Figure 12:
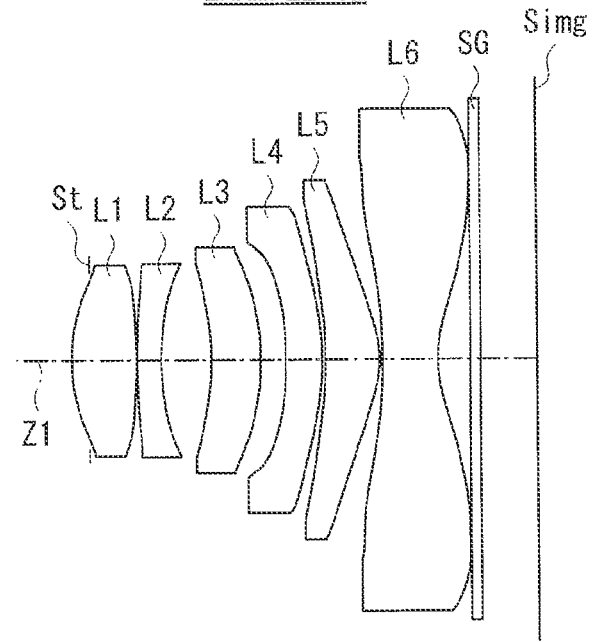
FIG. 12 illustrates a twelfth configuration example of the image pickup lens and is a lens cross-sectional view corresponding to Numerical Example 12.

Table 23 and Table 24 each show specific lens data corresponding to the image pickup lens according to the twelfth configuration example shown in FIG. 12. In particular, Table 23 shows basic lens data thereof, and Table 24 shows data related to the aspherical surfaces. Table 23 also shows values of F-number, the diagonal total angle of view $2\omega$, and the total focal length f.

In this twelfth configuration example, the fourth lens L4 has positive refractive power. The aperture stop St is arranged on the object plane side of the first lens L1.

Numerical Example 13

Figure 13:
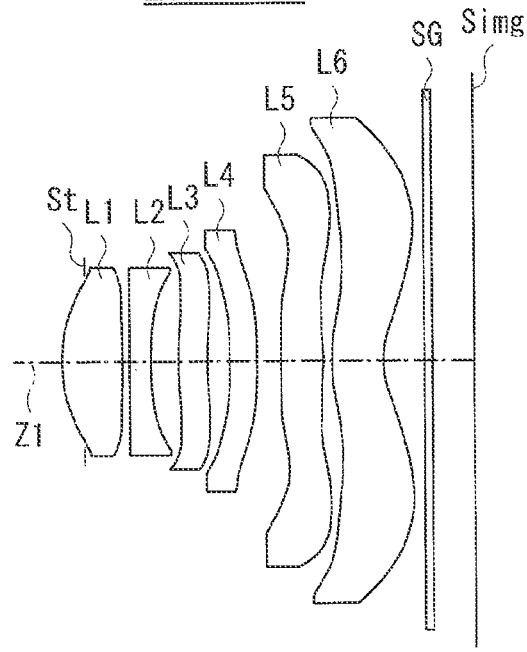
FIG. 13 illustrates a thirteenth configuration example of the image pickup lens and is a lens cross-sectional view corresponding to Numerical Example 13.

Table 25 and Table 26 each show specific lens data corresponding to the image pickup lens according to the thirteenth configuration example shown in FIG. 13. In particular, Table 25 shows basic lens data thereof, and Table 26 shows data related to the aspherical surfaces. Table 25 also shows values of F-number, the diagonal total angle of view $2\omega$, and the total focal length f.

In this thirteenth configuration example, the fourth lens L4 has positive refractive power. The aperture stop St is arranged on the object plane side of the first lens L1.

TABLE 23

| | | |
|---|---|---|
| FNo | | 2.3 |
| f | | 1.4 |
| $2\omega$ | | 70.0° |

Example 12. lens data

| lens | Si surface number | Ri curvature radius | Di spacing | Ndi refractive index | vdi Abbe number |
|---|---|---|---|---|---|
| | (STO) | ∞ | −0.066 | — | — |
| L1 | 1 | 0.601 | 0.236 | 1.535 | 56.3 |
| | 2 | −2.217 | 0.007 | — | — |
| L2 | 3 | 7.749 | 0.089 | 1.652 | 21.6 |
| | 4 | 1.172 | 0.181 | — | — |
| L3 | 5 | −1.064 | 0.184 | 1.535 | 56.3 |
| | 6 | −0.881 | 0.093 | — | — |
| L4 | 7 | −1.159 | 0.134 | 1.535 | 56.3 |
| | 8 | −0.723 | 0.010 | — | — |
| L5 | 9 | −0.893 | 0.200 | 1.535 | 56.3 |
| | 10 | −0.337 | 0.010 | — | — |
| L6 | 11 | −1.888 | 0.202 | 1.535 | 56.3 |
| | 12 | 0.320 | 0.122 | — | — |
| SG | 13 | ∞ | 0.036 | 1.518 | 64.1 |
| | 14 | ∞ | 0.199 | — | — |

TABLE 25

| | | |
|---|---|---|
| FNo | | 2.0 |
| f | | 1.2 |
| $2\omega$ | | 76.0° |

Example 13. lens data

| lens | Si surface number | Ri curvature radius | Di spacing | Ndi refractive index | vdi Abbe number |
|---|---|---|---|---|---|
| | (STO) | ∞ | −0.082 | — | — |
| L1 | 1 | 0.499 | 0.218 | 1.535 | 56.3 |
| | 2 | 33.487 | 0.027 | — | — |
| L2 | 3 | 51.940 | 0.079 | 1.636 | 23.8 |
| | 4 | 1.036 | 0.099 | — | — |
| L3 | 5 | 1.238 | 0.106 | 1.535 | 56.3 |
| | 6 | 1.727 | 0.083 | — | — |
| L4 | 7 | −1.909 | 0.099 | 1.636 | 23.8 |
| | 8 | −1.607 | 0.086 | — | — |
| L5 | 9 | −1.309 | 0.153 | 1.535 | 56.3 |
| | 10 | −0.755 | 0.031 | — | — |
| L6 | 11 | 0.477 | 0.190 | 1.535 | 56.3 |
| | 12 | 0.270 | 0.150 | — | — |
| SG | 13 | ∞ | 0.027 | 1.518 | 64.1 |
| | 14 | ∞ | 0.151 | — | — |

TABLE 24

Example 12 · aspherical surface data

| Si | K | A3 | A4 | A5 | A6 | A7 | A8 | A9 |
|---|---|---|---|---|---|---|---|---|
| 1 | −7.4373E−01 | — | 6.7646E−02 | — | −3.5831E+00 | — | 3.1788E+01 | — |
| 2 | −9.9821E+00 | — | 9.5681E−01 | — | −2.1051E+01 | — | 6.5943E+01 | — |
| 3 | −6.3398E+00 | 7.6093E−02 | 6.8559E−01 | 1.2669E+00 | 5.5945E+00 | −1.5708E+01 | −1.2651E+02 | 9.4610E+01 |
| 4 | −7.6597E+00 | 7.0002E−02 | 8.9061E−01 | 1.1673E+00 | 9.9163E+00 | 7.4424E+00 | −6.5192E+01 | −6.3577E+01 |
| 5 | −9.0832E+00 | −1.4705E−03 | −1.5015E+00 | 1.1773E+00 | 3.5781E+00 | −4.7502E+00 | 7.5135E+00 | 4.2343E+01 |
| 6 | −1.0000E+01 | −3.2631E−01 | −1.8276E−02 | −3.4769E+00 | 2.1755E+00 | 1.1700E+01 | 6.3140E+00 | −2.4756E+01 |
| 7 | 6.6769E+00 | −2.5916E−01 | 7.9449E−01 | 1.4851E+00 | −5.2670E+00 | −1.9946E+00 | 1.2703E+00 | 1.0471E+01 |
| 8 | 0.0000E+00 | 1.1468E+00 | −2.3058E+00 | 2.4689E+00 | 3.8630E+00 | −5.2494E−02 | −2.2100E+00 | −2.0286E+00 |
| 9 | 0.0000E+00 | 1.1536E+00 | −4.1886E−01 | −2.3776E+00 | 2.6474E+00 | 5.1014E+00 | −6.5013E+00 | −1.9055E+01 |
| 10 | −4.8502E+00 | 4.7905E−01 | −6.0655E−02 | −1.1259E+00 | 1.6303E+00 | −1.5310E+00 | −1.5026E+00 | 2.9525E+00 |
| 11 | 5.3579E+00 | 2.3916E−01 | −1.2205E+00 | 8.7222E−01 | 2.6567E+00 | 1.0467E−01 | −5.5980E−01 | −1.3301E+00 |
| 12 | −4.6751E+00 | −1.4209E+00 | 2.3605E+00 | −1.5207E+00 | 1.3447E−01 | −3.4378E−02 | −7.7923E−01 | 5.9760E−01 |

| Si | A10 | A11 | A12 | A13 | A14 | A15 | A16 | A17 |
|---|---|---|---|---|---|---|---|---|
| 1 | −5.6739E+02 | — | — | — | — | — | — | — |
| 2 | −3.7834E+02 | — | — | — | — | — | — | — |
| 3 | 4.5839E+02 | — | — | — | — | — | — | — |
| 4 | 2.4024E+02 | — | — | — | — | — | — | — |
| 5 | 1.2880E+02 | — | — | — | — | — | — | — |
| 6 | −6.0633E+01 | −1.3295E+02 | 7.2082E+00 | 6.6122E+02 | 2.5439E+03 | 4.7706E+03 | 4.4208E+03 | −2.5080E+04 |
| 7 | 6.9291E+00 | −2.4240E+01 | −1.6626E+02 | — | — | — | — | — |
| 8 | −2.0578E+01 | — | — | — | — | — | — | — |
| 9 | 2.9321E+01 | — | — | — | — | — | — | — |
| 10 | 2.6653E−01 | 3.0446E+00 | −4.7362E+00 | — | — | — | — | — |
| 11 | −2.6322E+00 | −1.5120E+00 | −3.5420E−01 | 1.6393E+00 | 5.9400E+00 | — | — | — |
| 12 | 6.4519E−01 | −3.0556E−02 | 1.1123E−01 | −2.9922E−01 | −3.5508E−01 | — | — | — |

TABLE 26

Example 13 · aspherical surface data

| Si | K | A3 | A4 | A5 | A6 | A7 | A8 | A9 |
|---|---|---|---|---|---|---|---|---|
| 1 | 4.3669E−01 | — | −8.7039E−01 | — | 4.6390E+00 | — | −1.1237E+02 | — |
| 2 | 1.0000E+01 | — | −2.4049E+00 | — | 6.7181E+01 | — | −1.1088E+03 | — |
| 3 | 1.0000E+01 | −1.0325E−01 | −5.0143E−01 | −3.1878E+01 | 4.5689E+02 | −2.0614E+03 | 4.8765E+03 | −9.5449E+03 |
| 4 | −2.1351E+00 | 1.0700E−01 | −4.3250E+00 | 2.5250E+00 | 2.1090E+01 | −8.9438E+01 | −1.6040E+02 | −1.3472E+03 |
| 5 | 0.0000E+00 | −1.6260E−01 | −3.0048E+00 | −6.5493E+00 | 2.3052E+01 | 3.4440E+01 | −1.0997E+02 | −2.3423E+02 |
| 6 | −1.2973E+01 | −2.3462E−01 | −2.2218E+00 | 2.8069E+00 | −5.4398E+00 | −5.1564E+01 | 1.7410E+02 | 5.1303E+02 |
| 7 | 0.0000E+00 | −2.2733E−01 | −3.9240E+00 | −1.2962E+01 | 1.2828E+02 | 7.0305E+01 | −2.5147E+03 | 7.8160E+03 |
| 8 | 1.0000E+01 | 1.6881E+00 | −1.4925E+01 | 3.3550E+01 | −2.2143E+01 | −6.5509E+00 | 4.7221E+01 | −4.1456E+01 |
| 9 | 2.4606E−01 | 3.0559E+00 | 1.6847E+00 | −2.4831E+01 | 6.8605E+00 | 1.3430E+02 | −1.9385E+02 | −2.1709E+02 |
| 10 | 0.0000E+00 | 7.9859E−01 | 1.0054E+01 | −1.0143E+01 | −3.4201E+01 | 1.9660E+01 | 5.1220E+01 | 4.3582E+01 |
| 11 | −1.2000E+01 | — | −2.8984E+00 | — | 7.3675E+00 | — | −3.0261E+00 | — |
| 12 | −3.5343E+00 | −1.5655E+00 | 1.4746E+00 | 1.2127E+00 | −4.8035E+00 | 5.0169E+00 | −9.4686E+00 | 1.1259E+01 |

| Si | A10 | A11 | A12 | A13 | A14 | A15 | A16 | A17 |
|---|---|---|---|---|---|---|---|---|
| 1 | −5.6977E+02 | — | 1.0871E+03 | — | 1.3455E+05 | — | −1.4233E+06 | — |
| 2 | 2.8710E+03 | — | 4.7107E+04 | — | −4.3894E+05 | — | 1.0969E+06 | — |
| 3 | 1.1959E+04 | — | — | — | — | — | — | — |
| 4 | 5.6023E+03 | — | — | — | — | — | — | — |
| 5 | 1.6839E+02 | — | — | — | — | — | — | — |
| 6 | −1.8428E+03 | — | — | — | — | — | — | — |
| 7 | −8.0932E+03 | — | — | — | — | — | — | — |
| 8 | 3.0981E+01 | — | — | — | — | — | — | — |
| 9 | 7.3053E+01 | 1.3646E+03 | −1.3238E+03 | — | — | — | — | — |
| 10 | −3.4510E+01 | −2.3331E+02 | 1.9623E+02 | — | — | — | — | — |
| 11 | −8.3237E+00 | — | 9.7743E−01 | — | 7.5111E+00 | — | — | — |
| 12 | 4.1156E−01 | −5.7748E+00 | 1.2174E+00 | — | — | — | — | — |

Numerical Example 14

Figure 14:
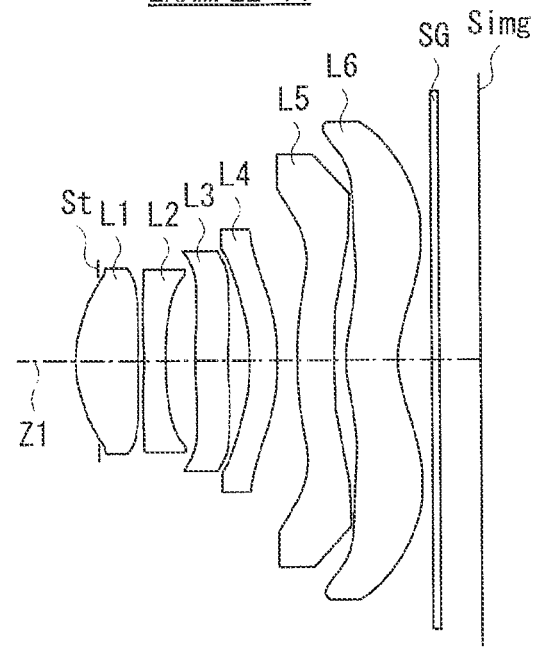
FIG. 14 illustrates a fourteenth configuration example of the image pickup lens and is a lens cross-sectional view corresponding to Numerical Example 14.

Table 27 and Table 28 each show specific lens data corresponding to the image pickup lens according to the fourteenth configuration example shown in FIG. 14. In particular, Table 27 shows basic lens data thereof, and Table 28 shows data related to the aspherical surfaces. Table 27 also shows values of F-number, the diagonal total angle of view 2ω, and the total focal length f.

In this fourteenth configuration example, the fourth lens L4 has negative refractive power. The aperture stop St is arranged on the object plane side of the first lens L1.

TABLE 27

| | |
|---|---|
| FNo | 2.0 |
| f | 1.2 |
| 2ω | 76.0° |

TABLE 27-continued

Example 14. lens data

| lens | Si surface number | Ri curvature radius | Di spacing | Ndi refractive index | νdi Abbe number |
|---|---|---|---|---|---|
| | (STO) | ∞ | −0.082 | — | — |
| L1 | 1 | 0.478 | 0.223 | 1.535 | 56.3 |
| | 2 | 33.487 | 0.020 | — | — |
| L2 | 3 | −8.266 | 0.079 | 1.636 | 23.8 |
| | 4 | 1.256 | 0.106 | — | — |
| L3 | 5 | 1.327 | 0.121 | 1.535 | 56.3 |
| | 6 | 2.072 | 0.077 | — | — |
| L4 | 7 | −1.218 | 0.099 | 1.636 | 23.8 |
| | 8 | −1.638 | 0.074 | — | — |
| L5 | 9 | 2.768 | 0.131 | 1.535 | 56.3 |
| | 10 | 6.329 | 0.045 | — | — |
| L6 | 11 | 0.422 | 0.186 | 1.535 | 56.3 |
| | 12 | 0.301 | 0.124 | — | — |
| SG | 13 | ∞ | 0.027 | 1.518 | 64.1 |
| | 14 | ∞ | 0.151 | — | — |

TABLE 28

Example 14 · aspherical surface data

| Si | K | A3 | A4 | A5 | A6 | A7 | A8 | A9 |
|---|---|---|---|---|---|---|---|---|
| 1 | 1.9837E−01 | — | −4.9132E−01 | — | −8.9430E−01 | — | −2.2816E+00 | — |
| 2 | 1.0000E+01 | — | −3.0435E+00 | — | 7.7673E+01 | — | −1.2644E+03 | — |
| 3 | 1.0000E+01 | 1.2880E−03 | −1.2102E+00 | −3.0286E+01 | 4.7385E+02 | −2.0733E+03 | 4.6584E+03 | −9.9693E+03 |
| 4 | 8.0563E−01 | 2.8821E−01 | −5.1710E+00 | 3.3561E+01 | 1.1792E+00 | −1.1024E+02 | −1.1070E+02 | −1.0655E+03 |
| 5 | 0.0000E+00 | −5.7905E−01 | 2.3525E+00 | −3.3534E+01 | 8.2915E+01 | 1.4912E+01 | −2.6216E+02 | −4.8387E+02 |
| 6 | 1.0279E+01 | −1.4260E−01 | −5.2040E+00 | 1.9446E+01 | −2.7764E+01 | −1.2190E+02 | 2.1854E+02 | 1.1266E+03 |
| 7 | 0.0000E+00 | −1.4238E+00 | 6.2458E−01 | −1.5820E+01 | 1.3334E+02 | 7.6757E+01 | −2.5375E+03 | 7.6827E+03 |
| 8 | 1.0000E+01 | −5.3214E+00 | −9.5072E+00 | 3.6577E+01 | −3.0523E+01 | −1.5429E+01 | 5.5758E+01 | −1.7532E+01 |
| 9 | 1.0249E+01 | 6.9918E−01 | 3.8789E+00 | −1.9715E+01 | −2.3611E+00 | 1.2132E+02 | −1.9089E+02 | −1.8788E+02 |
| 10 | 0.0000E+00 | −9.1388E−01 | 1.1040E+01 | −1.3792E+01 | −2.9840E+01 | 2.9165E+01 | 4.6843E+01 | 2.0327E+01 |
| 11 | −1.2000E+01 | — | −4.0942E+00 | — | 1.4991E+01 | — | −1.6541E+01 | — |
| 12 | −4.4287E+00 | −5.9503E−01 | −3.0076E+00 | 9.1644E+00 | −9.5689E+00 | 9.5160E−01 | −4.7568E+00 | 1.6317E+01 |

TABLE 28-continued

Example 14 · aspherical surface data

| | A10 | A11 | A12 | A13 | A14 | A15 | A16 | A17 |
|---|---|---|---|---|---|---|---|---|
| 1 | −1.3563E+03 | — | −2.6723E+03 | — | 2.3675E+05 | — | −2.1566E+06 | — |
| 2 | 2.5304E+03 | — | 5.3038E+04 | — | −3.7440E+05 | — | 6.1879E+05 | — |
| 3 | 1.4429E+04 | — | — | — | — | — | — | — |
| 4 | 5.8810E+03 | — | — | — | — | — | — | — |
| 5 | 1.2653E+03 | — | — | — | — | — | — | — |
| 6 | −2.6591E+03 | — | — | — | — | — | — | — |
| 7 | −7.8741E+03 | — | — | — | — | — | — | — |
| 8 | −3.4706E+01 | — | — | — | — | — | — | — |
| 9 | 1.1327E+02 | 1.3734E+03 | −1.4328E+03 | — | — | — | — | — |
| 10 | −3.6439E+01 | −1.9132E+02 | 1.6758E+02 | — | — | — | — | — |
| 11 | −8.2848E+00 | — | 1.5871E+01 | — | 9.5813E−01 | — | — | — |
| 12 | −2.8969E+00 | −1.2154E+01 | 5.3503E+00 | — | — | — | — | — |

Numerical Example 15

Figure 15:
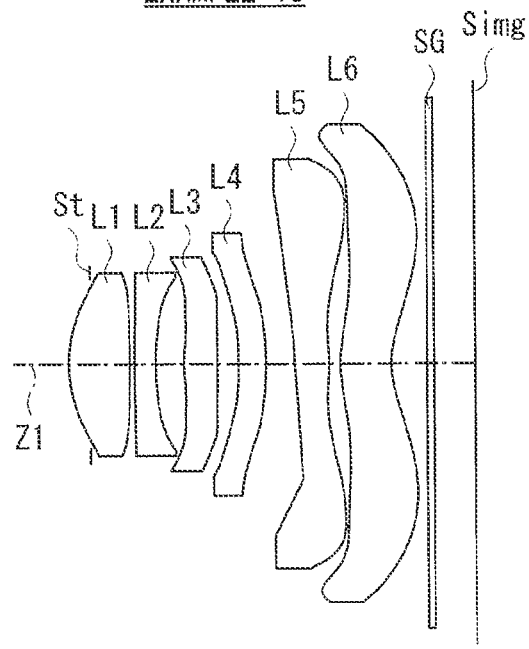
FIG. 15 illustrates a fifteenth configuration example of the image pickup lens and is a lens cross-sectional view corresponding to Numerical Example 15.

Table 29 and Table 30 each show specific lens data corresponding to the image pickup lens according to the fifteenth configuration example shown in FIG. 15. In particular, Table 29 shows basic lens data thereof, and Table 30 shows data related to the aspherical surfaces. Table 29 also shows values of F-number, the diagonal total angle of view $2\omega$, and the total focal length f.

In this fifteenth configuration example, the fourth lens L4 has negative refractive power. The aperture stop St is arranged on the object plane side of the first lens L1.

TABLE 29

| FNo | 2.0 |
|---|---|
| f | 1.2 |
| $2\omega$ | 75.8° |

TABLE 29-continued

Example 15. lens data

| lens | Si surface number | Ri curvature radius | Di spacing | Ndi refractive index | νdi Abbe number |
|---|---|---|---|---|---|
| | (STO) | ∞ | −0.082 | — | — |
| L1 | 1 | 0.499 | 0.222 | 1.535 | 56.3 |
| | 2 | 33.487 | 0.020 | — | — |
| L2 | 3 | 20.750 | 0.079 | 1.636 | 23.8 |
| | 4 | 1.039 | 0.108 | — | — |
| L3 | 5 | 1.869 | 0.121 | 1.535 | 56.3 |
| | 6 | 5.088 | 0.078 | — | — |
| L4 | 7 | −1.449 | 0.099 | 1.636 | 23.8 |
| | 8 | −1.662 | 0.101 | — | — |
| L5 | 9 | −25.886 | 0.132 | 1.535 | 56.3 |
| | 10 | −1.964 | 0.045 | — | — |
| L6 | 11 | 0.480 | 0.186 | 1.535 | 56.3 |
| | 12 | 0.295 | 0.136 | — | — |
| SG | 13 | ∞ | 0.027 | 1.518 | 64.1 |
| | 14 | ∞ | 0.151 | — | — |

TABLE 30

Example 15 · aspherical surface data

| Si | K | A3 | A4 | A5 | A6 | A7 | A8 | A9 |
|---|---|---|---|---|---|---|---|---|
| 1 | 4.0930E−01 | — | −6.3562E−01 | — | −8.3510E−01 | — | −3.1726E+01 | — |
| 2 | 1.0000E+01 | — | −2.6923E+00 | — | 7.3210E+01 | — | −1.1308E+03 | — |
| 3 | 1.0000E+01 | −5.0766E−02 | −1.2371E+00 | −3.2151E+01 | 4.6452E+02 | −2.0513E+03 | 4.8490E+03 | −9.6412E+03 |
| 4 | −3.4503E+00 | 2.6283E−01 | −4.7650E+00 | 2.6103E+01 | 1.3957E+01 | −9.1870E+01 | −7.7447E+01 | −1.1378E+03 |
| 5 | 0.0000E+00 | −4.1674E−01 | 1.3935E+00 | −2.8266E+01 | 6.4828E+01 | 1.7115E+01 | −1.7330E+02 | −6.1065E+02 |
| 6 | −1.0485E+01 | −1.3257E−01 | −4.0047E+00 | 1.2441E+01 | −1.5574E+01 | −1.1961E+02 | 1.7699E+02 | 9.3493E+02 |
| 7 | 0.0000E+00 | −3.8158E−01 | −4.1630E+00 | −1.1869E+01 | 1.3991E+02 | 7.2511E+01 | −2.5976E+03 | 7.6055E+03 |
| 8 | 1.0000E+01 | 8.4122E−01 | −1.3566E+01 | 3.5144E+01 | −2.2191E+01 | −7.4424E+00 | 5.3986E+01 | −4.0183E+01 |
| 9 | −1.0115E+01 | 1.7408E+00 | 3.3012E+00 | −2.4096E+01 | 3.8810E+00 | 1.3084E+02 | −1.9284E+02 | −2.0971E+02 |
| 10 | 0.0000E+00 | 2.0828E−01 | 9.8299E+00 | −1.1472E+01 | −3.3133E+01 | 2.3386E+01 | 5.3030E+01 | 3.7832E+01 |
| 11 | −1.2000E+01 | — | −3.6124E+00 | — | 1.1744E+01 | — | −8.5685E+00 | — |
| 12 | −4.0769E+00 | −7.7845E−01 | −1.6106E+00 | 5.4831E+00 | −5.8845E+00 | 2.9247E+00 | −9.2176E+00 | 1.3342E+01 |

| | A10 | A11 | A12 | A13 | A14 | A15 | A16 | A17 |
|---|---|---|---|---|---|---|---|---|
| 1 | −6.5742E+02 | — | −2.9829E+03 | — | 1.2904E+05 | — | −1.1374E+06 | — |
| 2 | 2.6551E+03 | — | 4.7501E+04 | — | −4.2191E+05 | — | 1.0798E+06 | — |
| 3 | 1.2092E+04 | — | — | — | — | — | — | — |
| 4 | 4.9090E+03 | — | — | — | — | — | — | — |
| 5 | 1.3717E+03 | — | — | — | — | — | — | — |
| 6 | −2.0250E+03 | — | — | — | — | — | — | — |
| 7 | −7.3033E+03 | — | — | — | — | — | — | — |
| 8 | −5.0804E+01 | — | — | — | — | — | — | — |
| 9 | 8.3128E+01 | 1.3681E+03 | −1.3499E+03 | — | — | — | — | — |
| 10 | −3.9692E+01 | −2.3137E+02 | 1.9522E+02 | — | — | — | — | — |
| 11 | −1.1610E+01 | — | 4.2966E+00 | — | 1.1766E+01 | — | — | — |
| 12 | 4.2428E−01 | −6.7634E+00 | 9.1826E−01 | — | — | — | — | — |

Numerical Example 16

Figure 16:
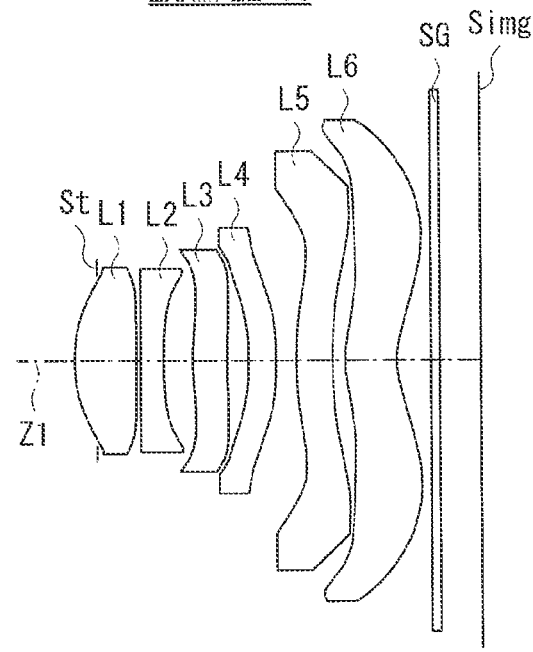
FIG. 16 illustrates a sixteenth configuration example of the image pickup lens and is a lens cross-sectional view corresponding to Numerical Example 16.
Figure 17:
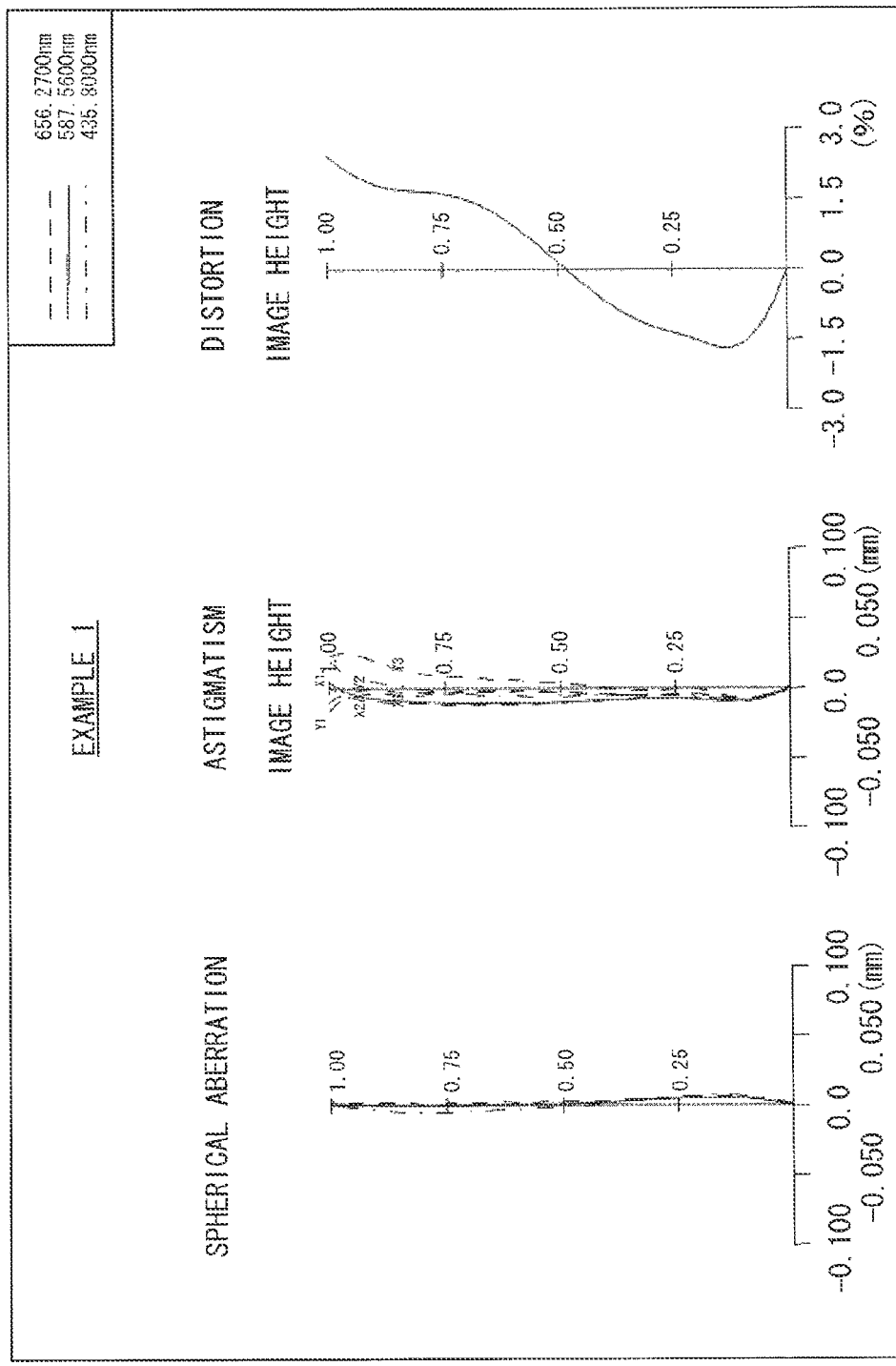
FIG. 17 is an aberration diagram illustrating spherical aberration, astigmatism, and distortion of an image pickup lens corresponding to Numerical Example 1.
Figure 18:
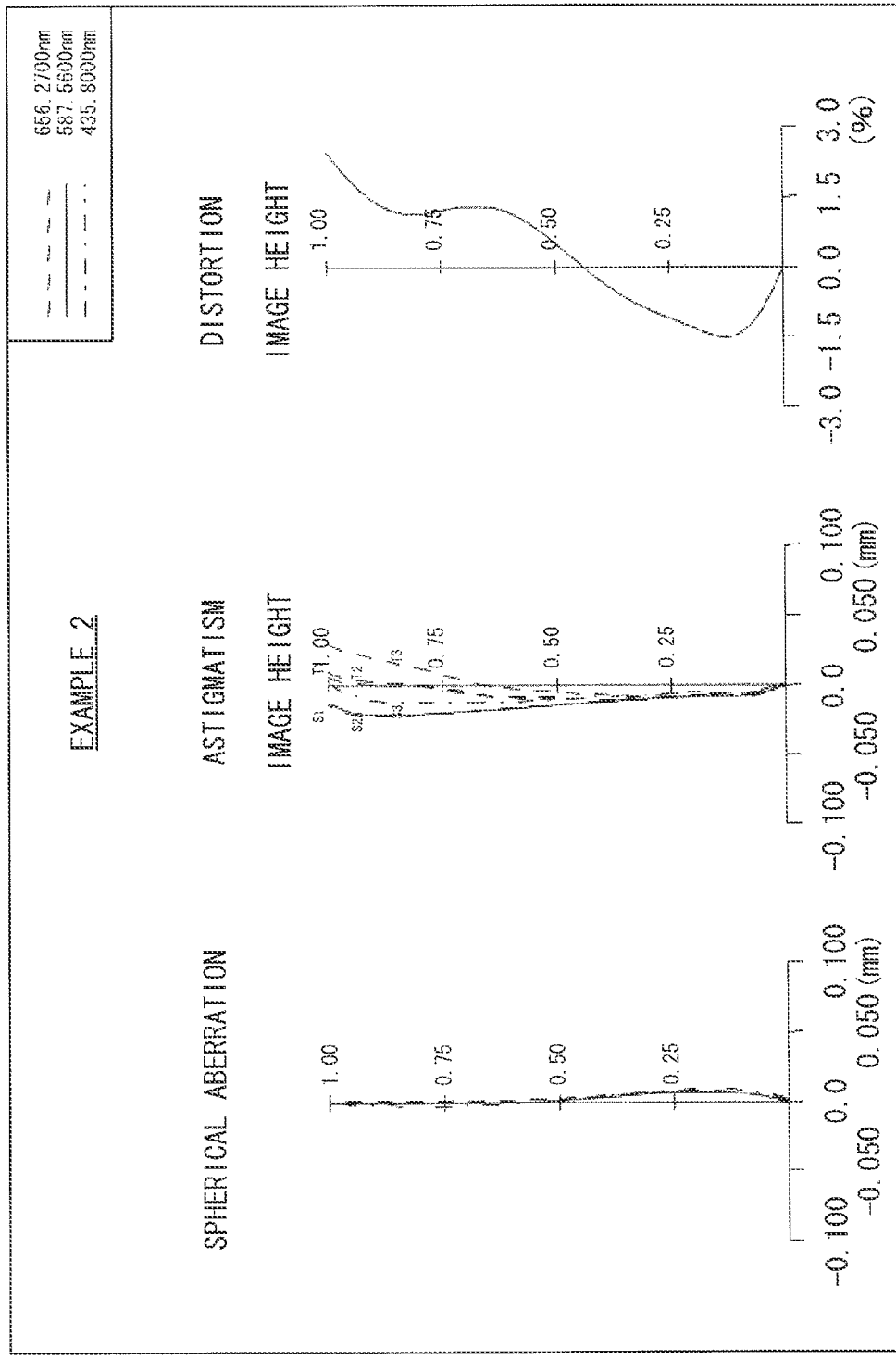
FIG. 18 is an aberration diagram illustrating spherical aberration, astigmatism, and distortion of an image pickup lens corresponding to Numerical Example 2.
Figure 19:
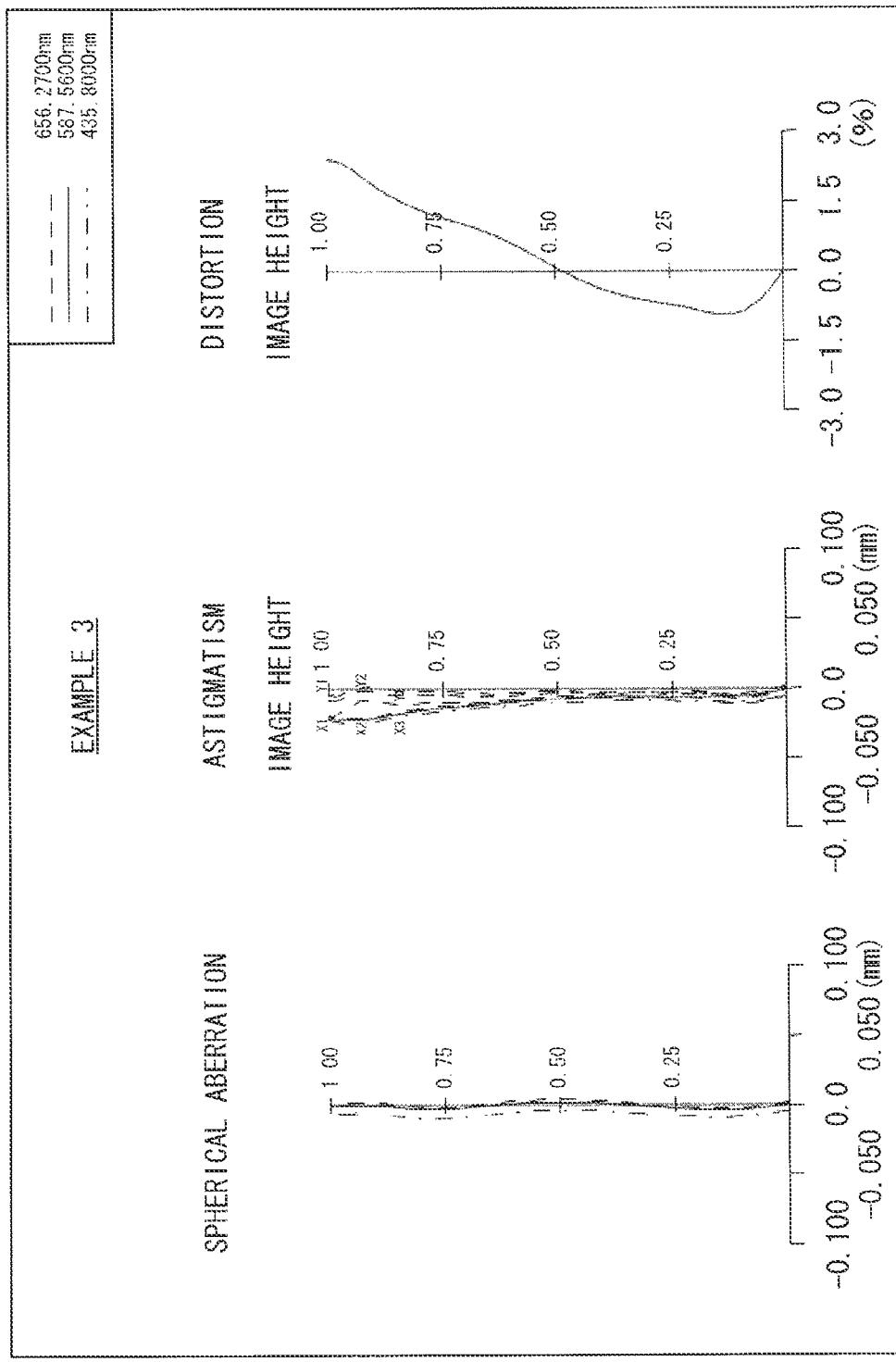
FIG. 19 is an aberration diagram illustrating spherical aberration, astigmatism, and distortion of an image pickup lens corresponding to Numerical Example 3.
Figure 20:
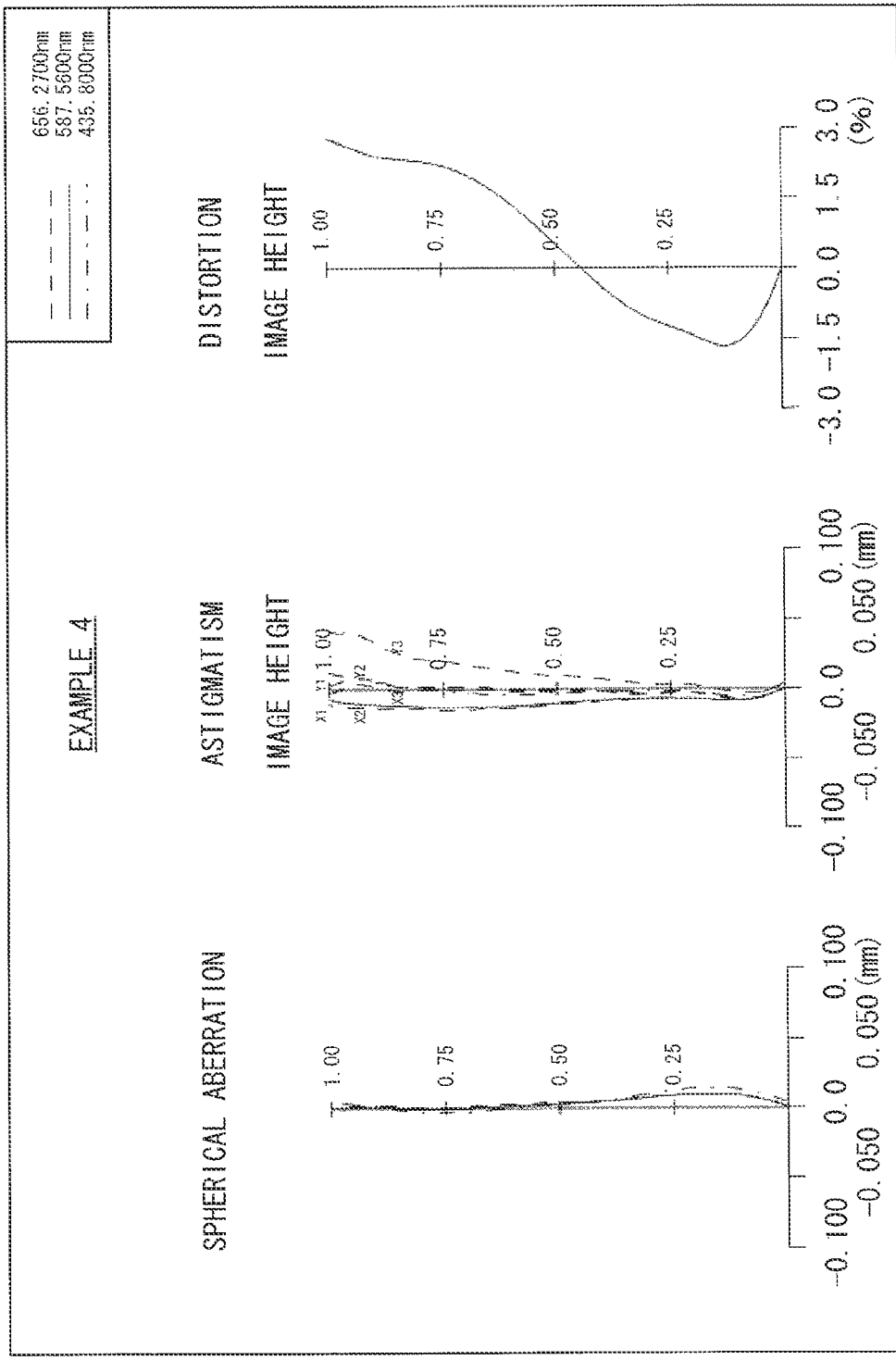
FIG. 20 is an aberration diagram illustrating spherical aberration, astigmatism, and distortion of an image pickup lens corresponding to Numerical Example 4.
Figure 21:
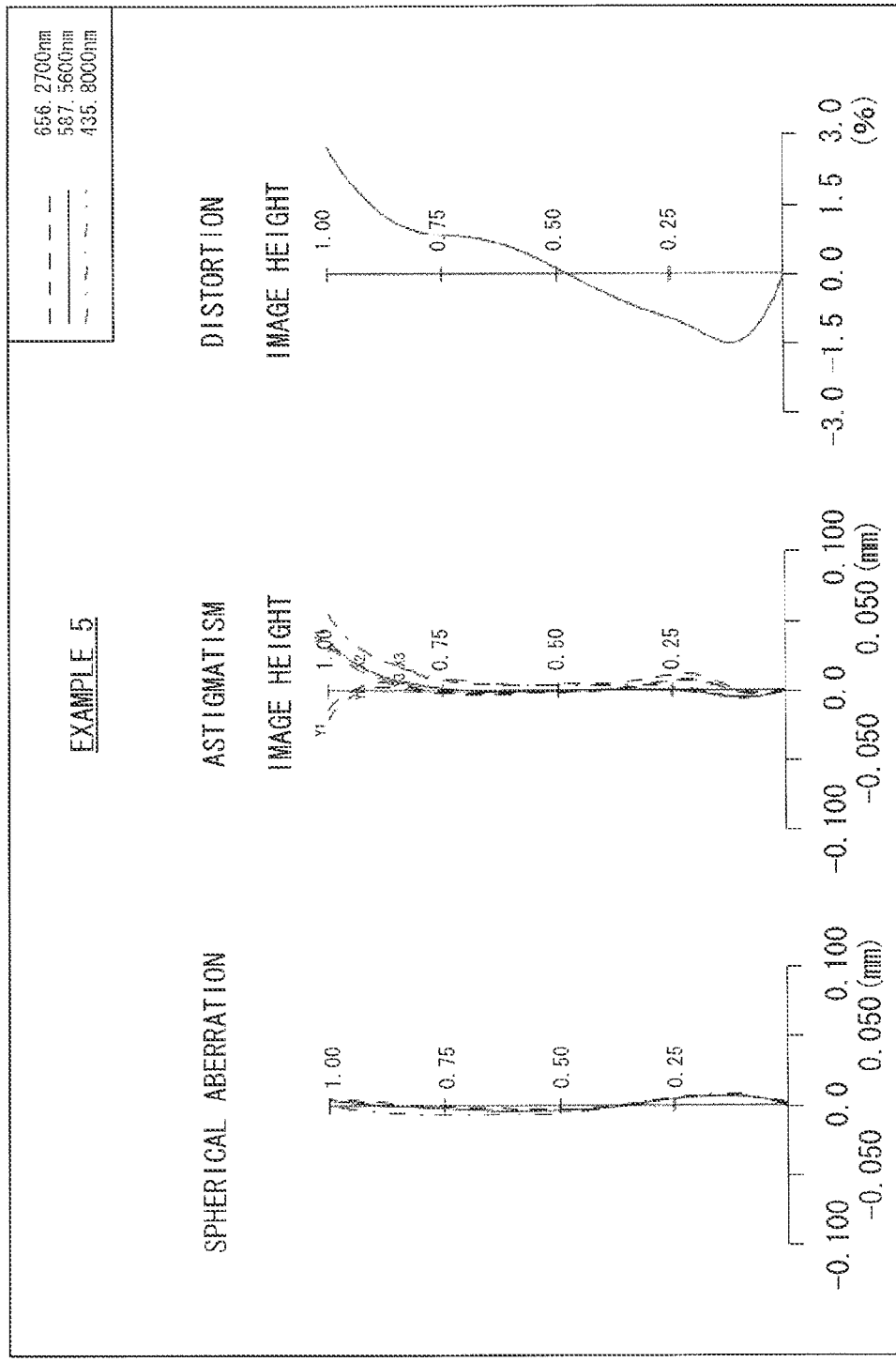
FIG. 21 is an aberration diagram illustrating spherical aberration, astigmatism, and distortion of an image pickup lens corresponding to Numerical Example 5.
Figure 22:
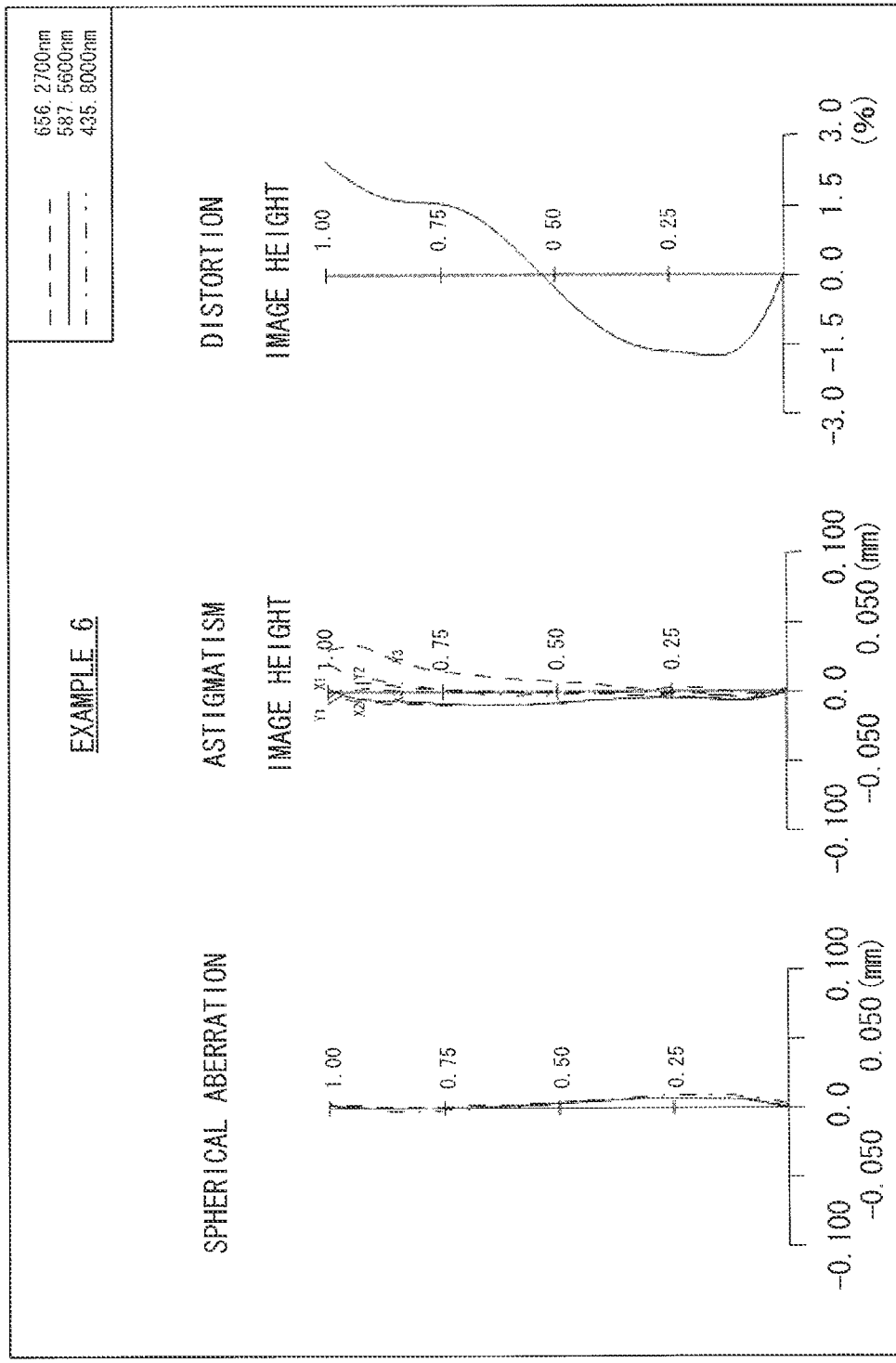
FIG. 22 is an aberration diagram illustrating spherical aberration, astigmatism, and distortion of an image pickup lens corresponding to Numerical Example 6.
Figure 23:
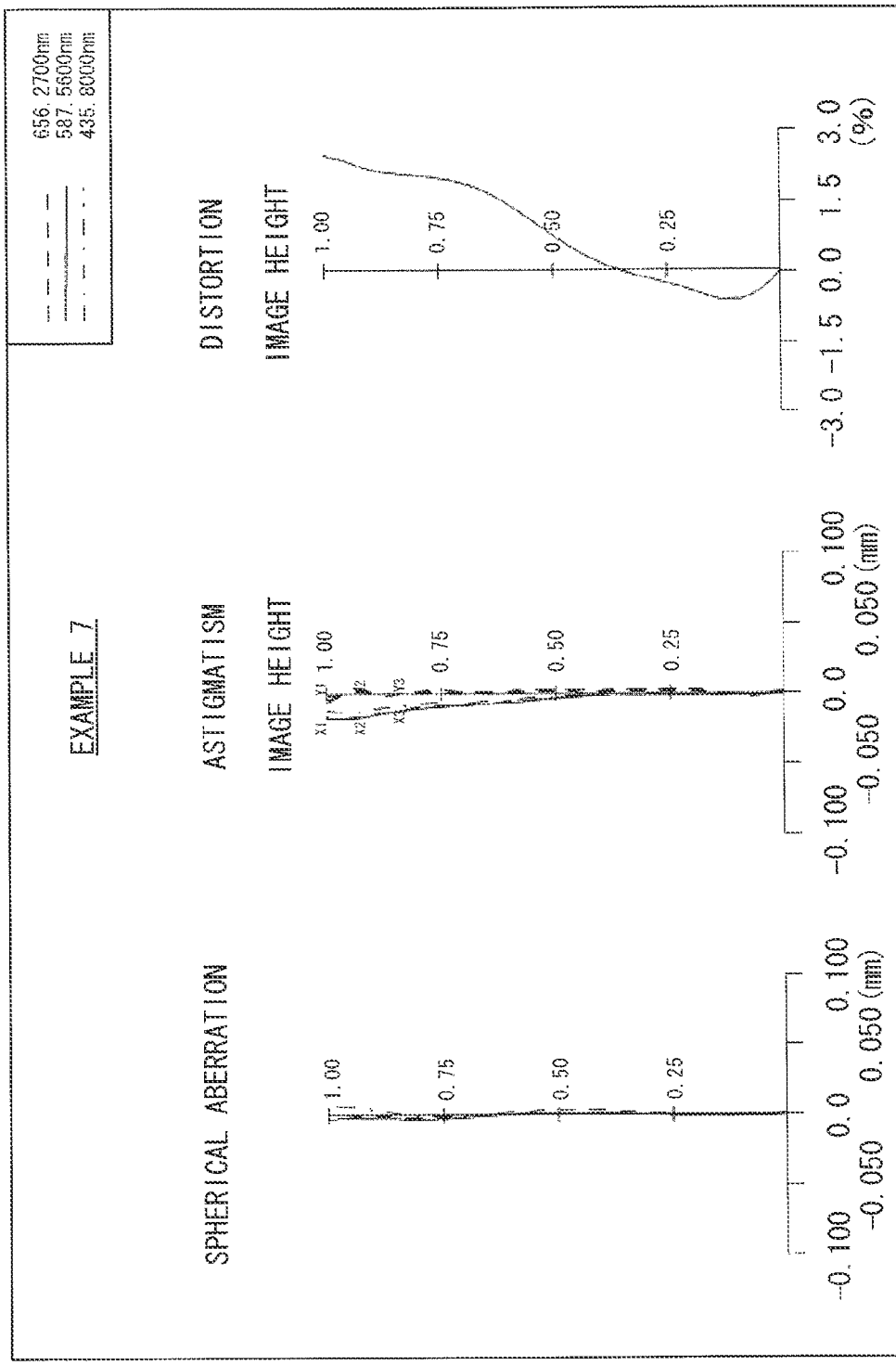
FIG. 23 is an aberration diagram illustrating spherical aberration, astigmatism, and distortion of an image pickup lens corresponding to Numerical Example 7.
Figure 24:
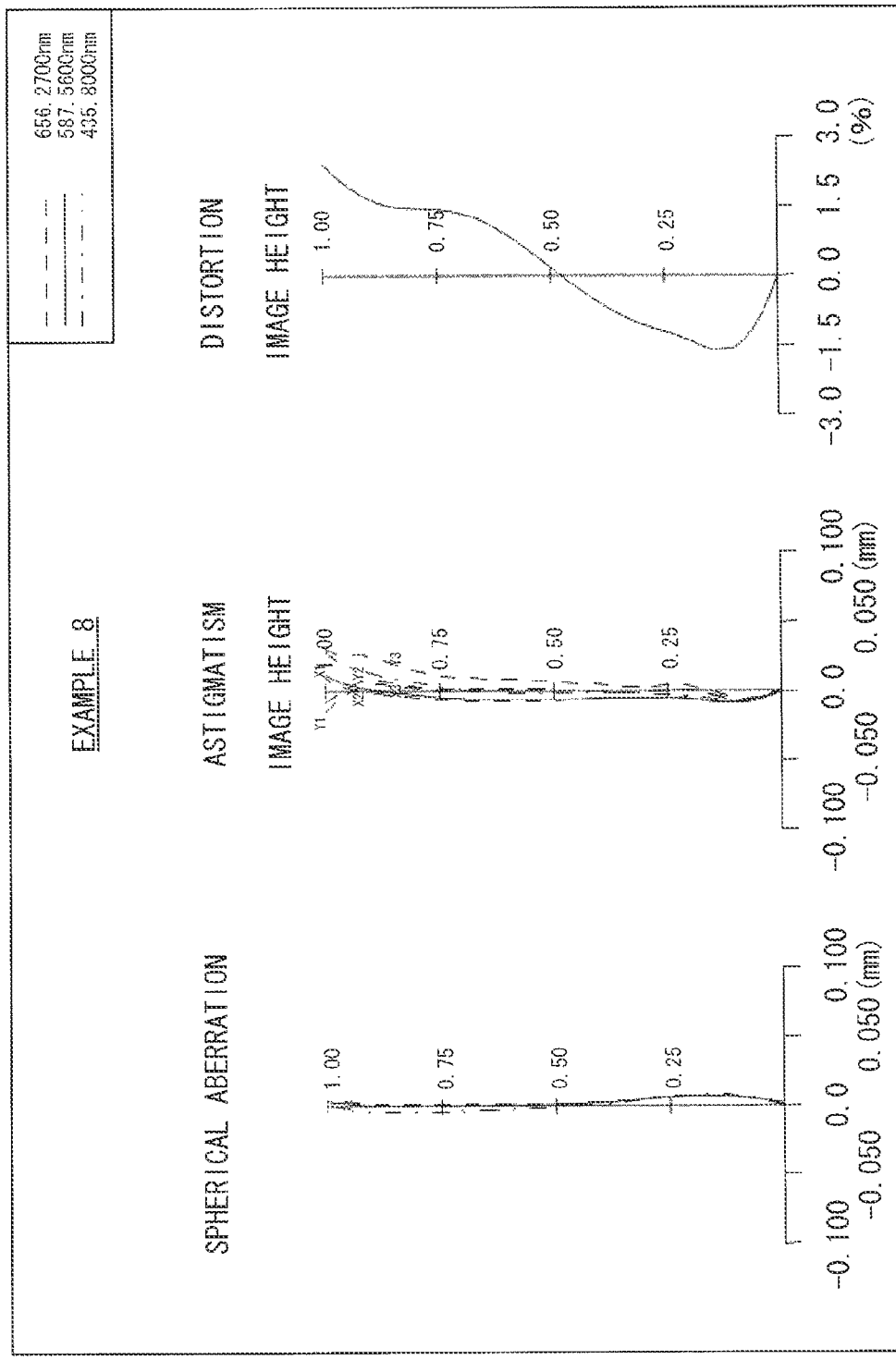
FIG. 24 is an aberration diagram illustrating spherical aberration, astigmatism, and distortion of an image pickup lens corresponding to Numerical Example 8.
Figure 25:
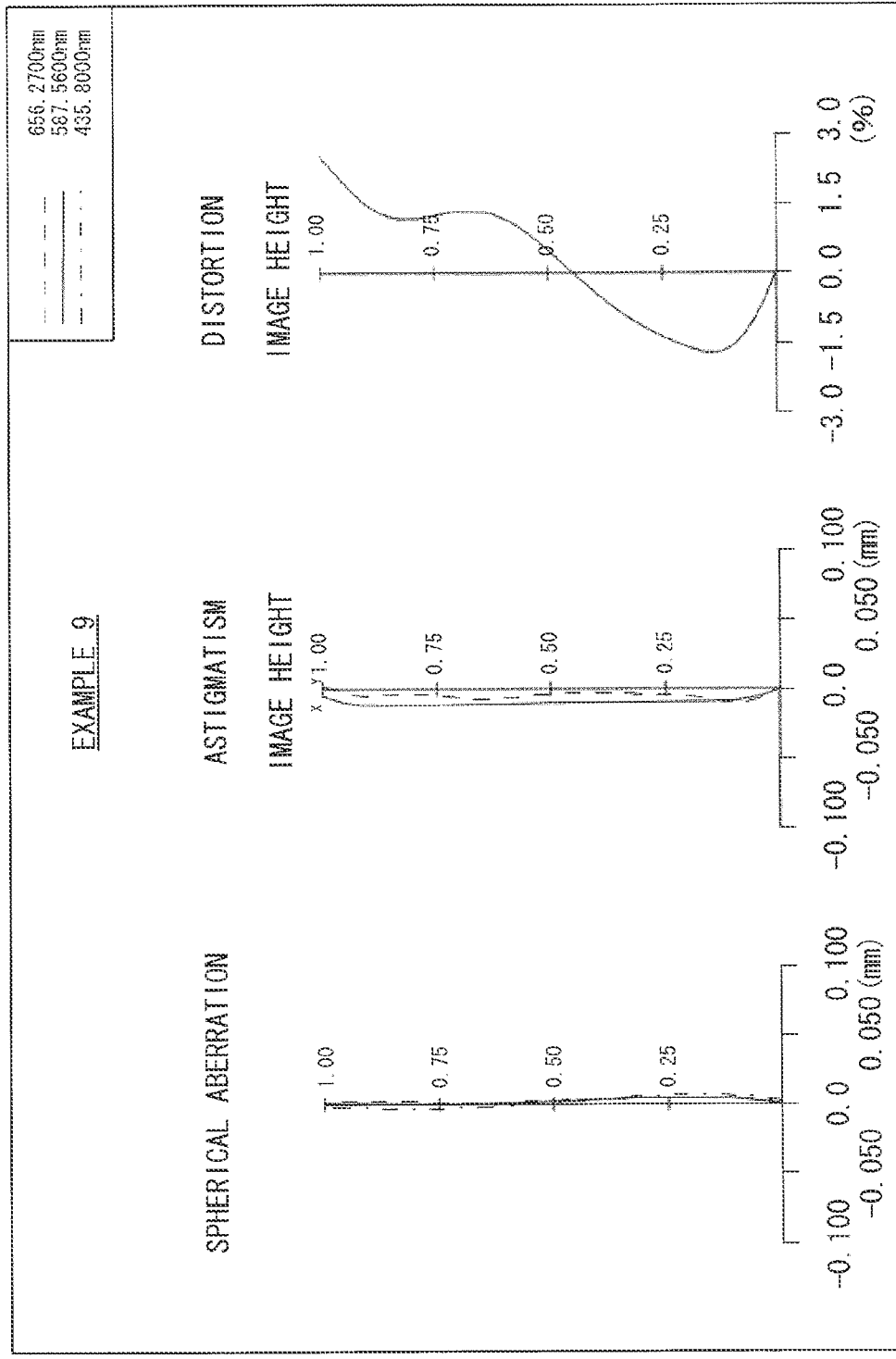
FIG. 25 is an aberration diagram illustrating spherical aberration, astigmatism, and distortion of an image pickup lens corresponding to Numerical Example 9.
Figure 26:
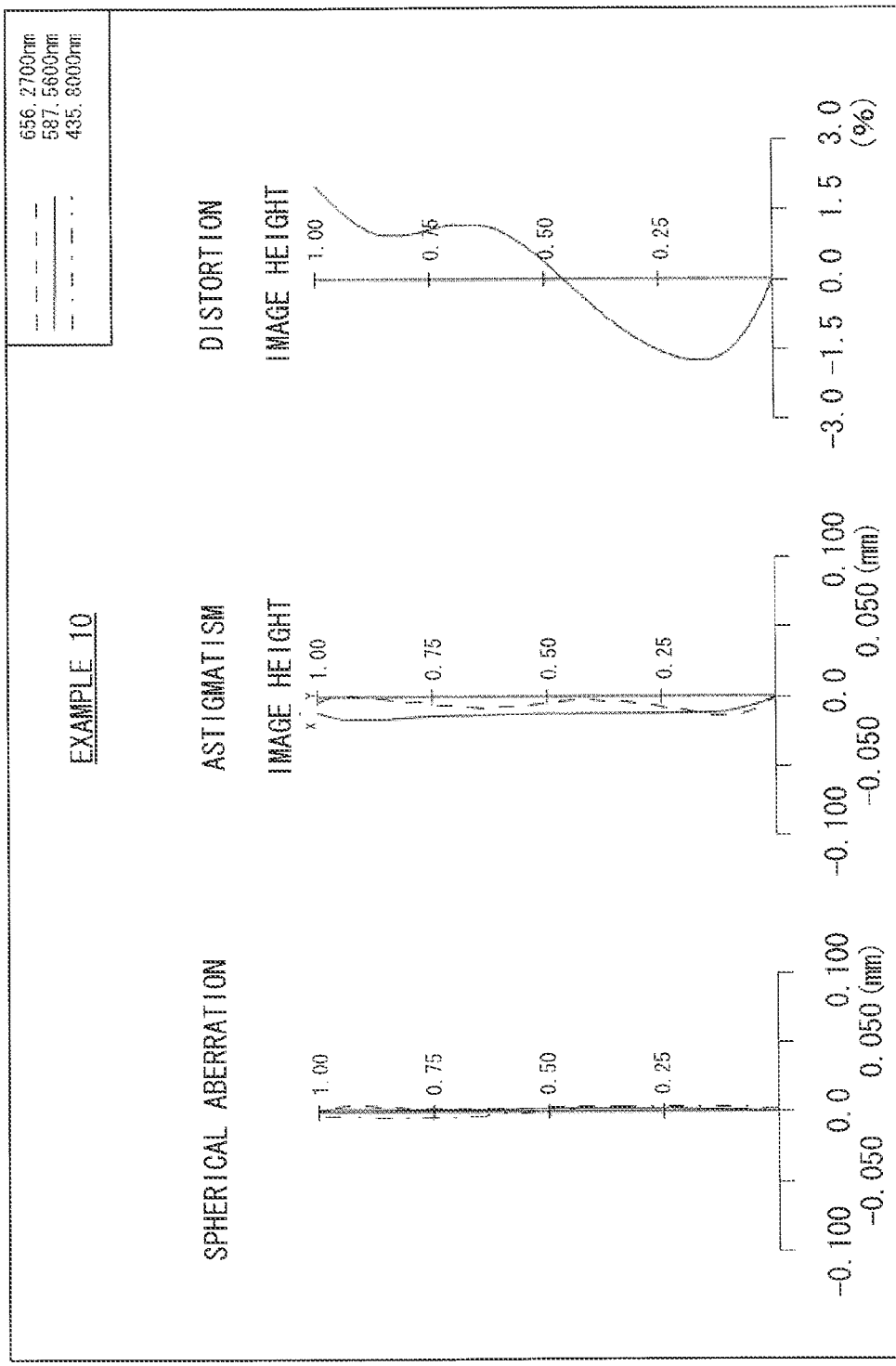
FIG. 26 is an aberration diagram illustrating spherical aberration, astigmatism, and distortion of an image pickup lens corresponding to Numerical Example 10.
Figure 27:
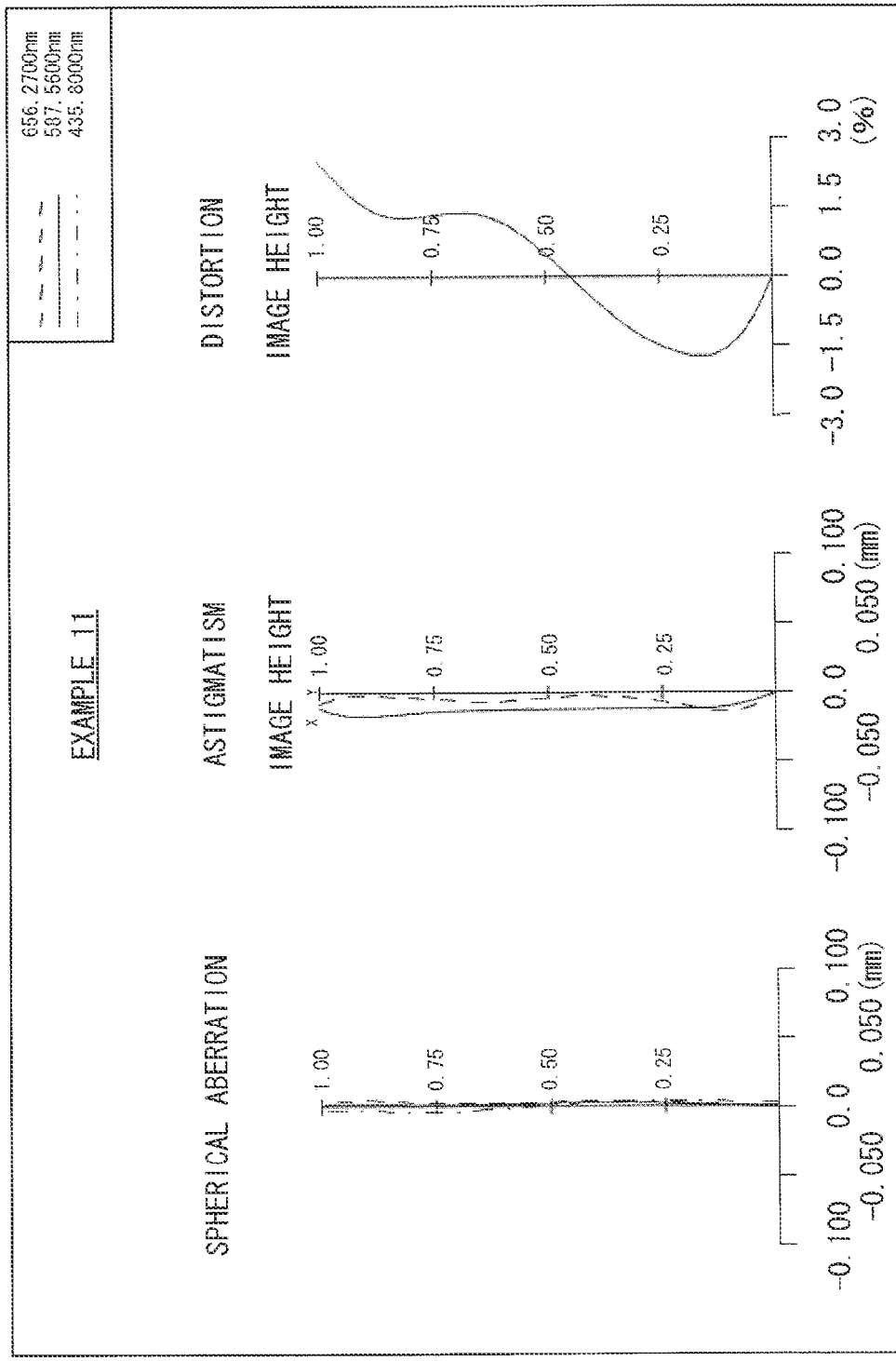
FIG. 27 is an aberration diagram illustrating spherical aberration, astigmatism, and distortion of an image pickup lens corresponding to Numerical Example 11.
Figure 28:
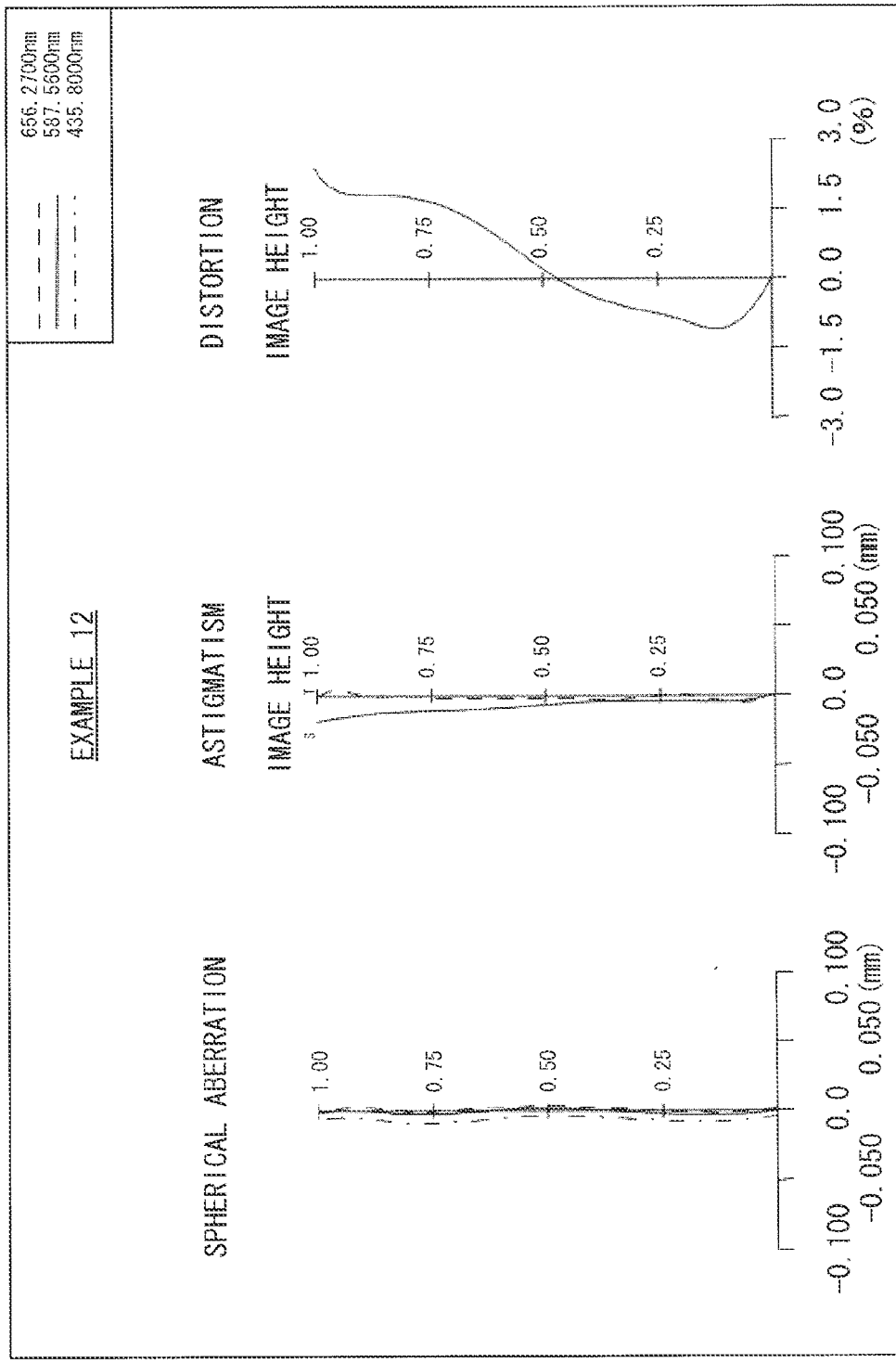
FIG. 28 is an aberration diagram illustrating spherical aberration, astigmatism, and distortion of an image pickup lens corresponding to Numerical Example 12.
Figure 29:
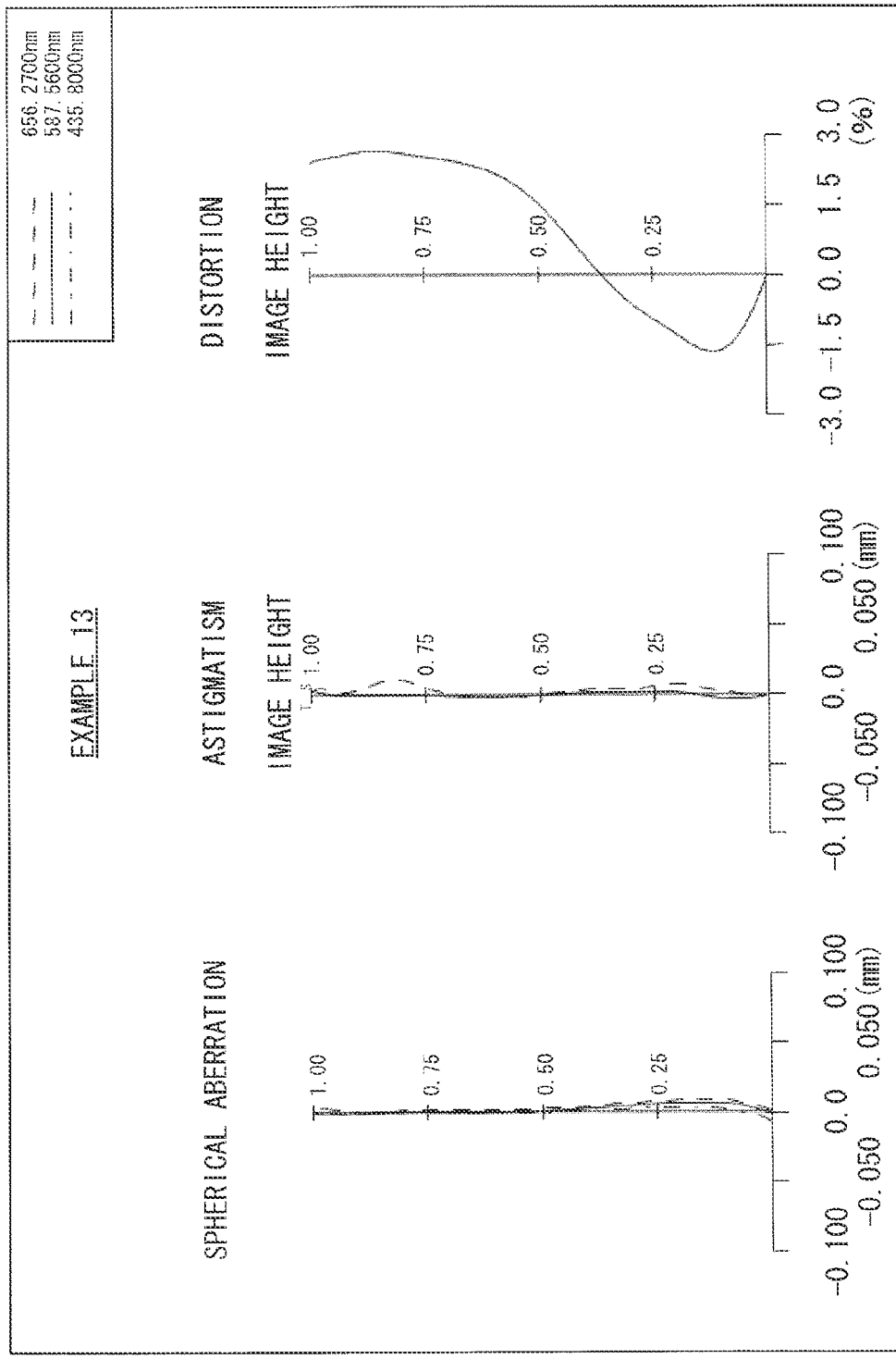
FIG. 29 is an aberration diagram illustrating spherical aberration, astigmatism, and distortion of an image pickup lens corresponding to Numerical Example 13.
Figure 30:
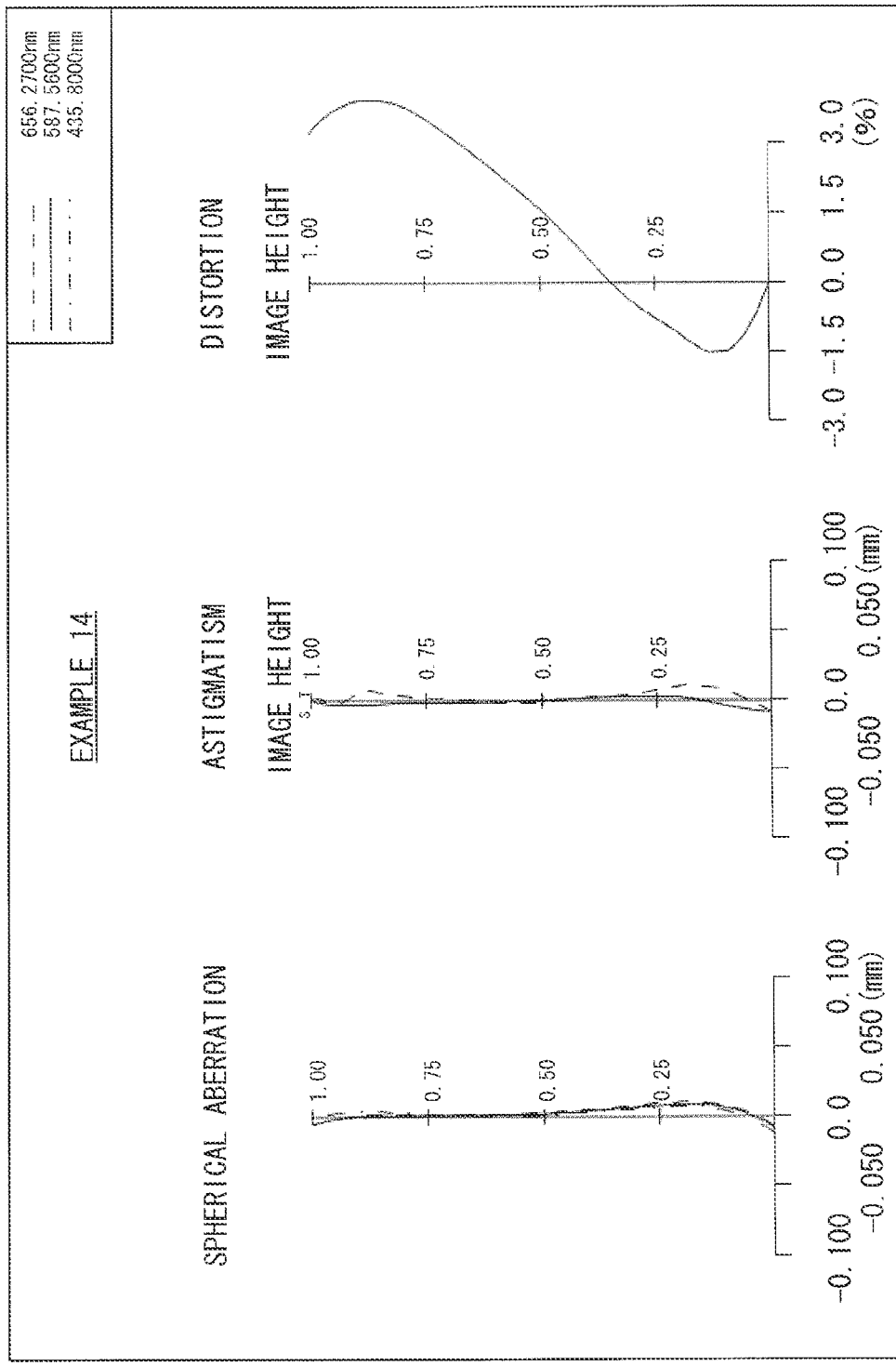
FIG. 30 is an aberration diagram illustrating spherical aberration, astigmatism, and distortion of an image pickup lens corresponding to Numerical Example 14.
Figure 31:
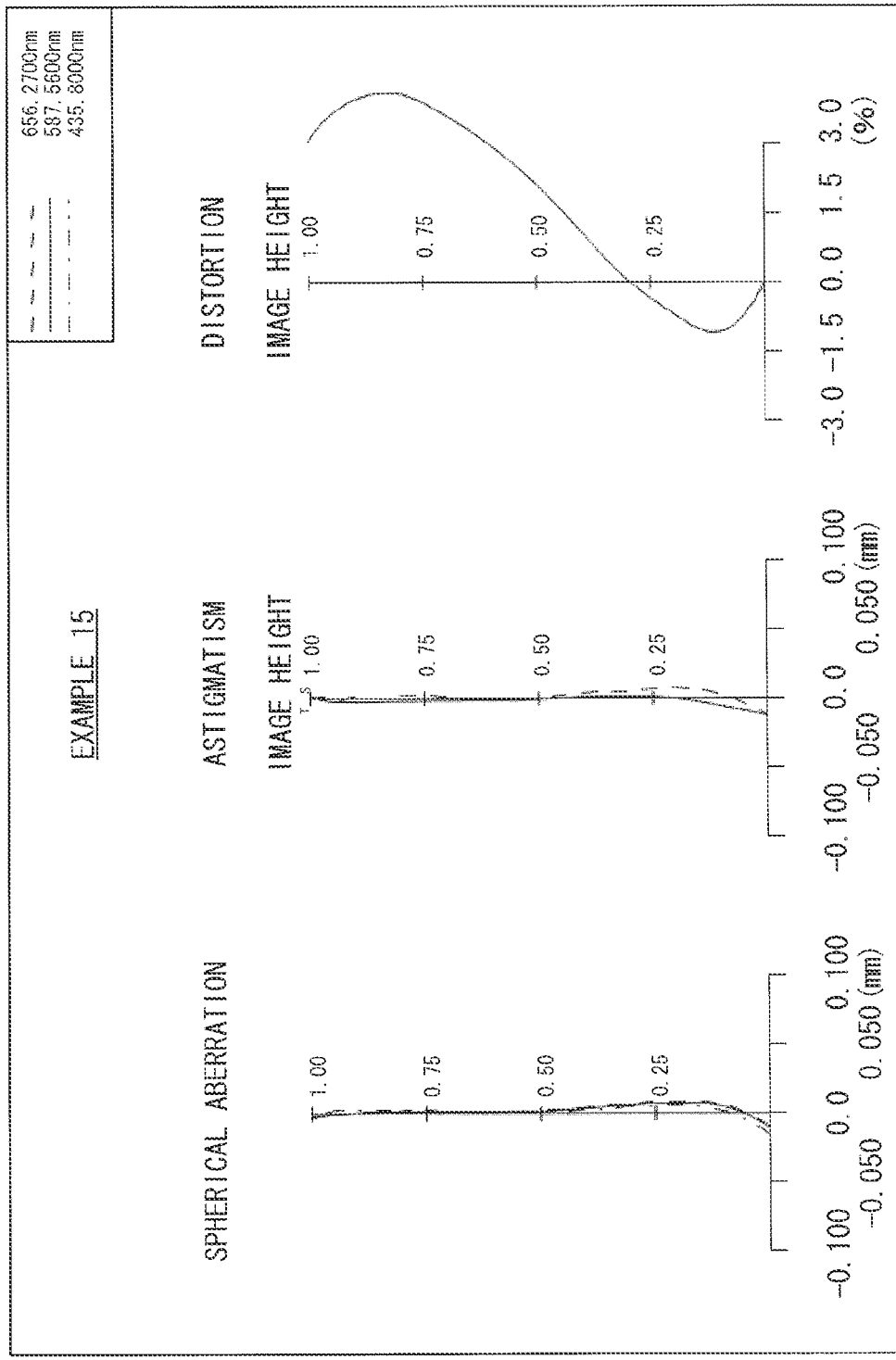
FIG. 31 is an aberration diagram illustrating spherical aberration, astigmatism, and distortion of an image pickup lens corresponding to Numerical Example 15.
Figure 32:
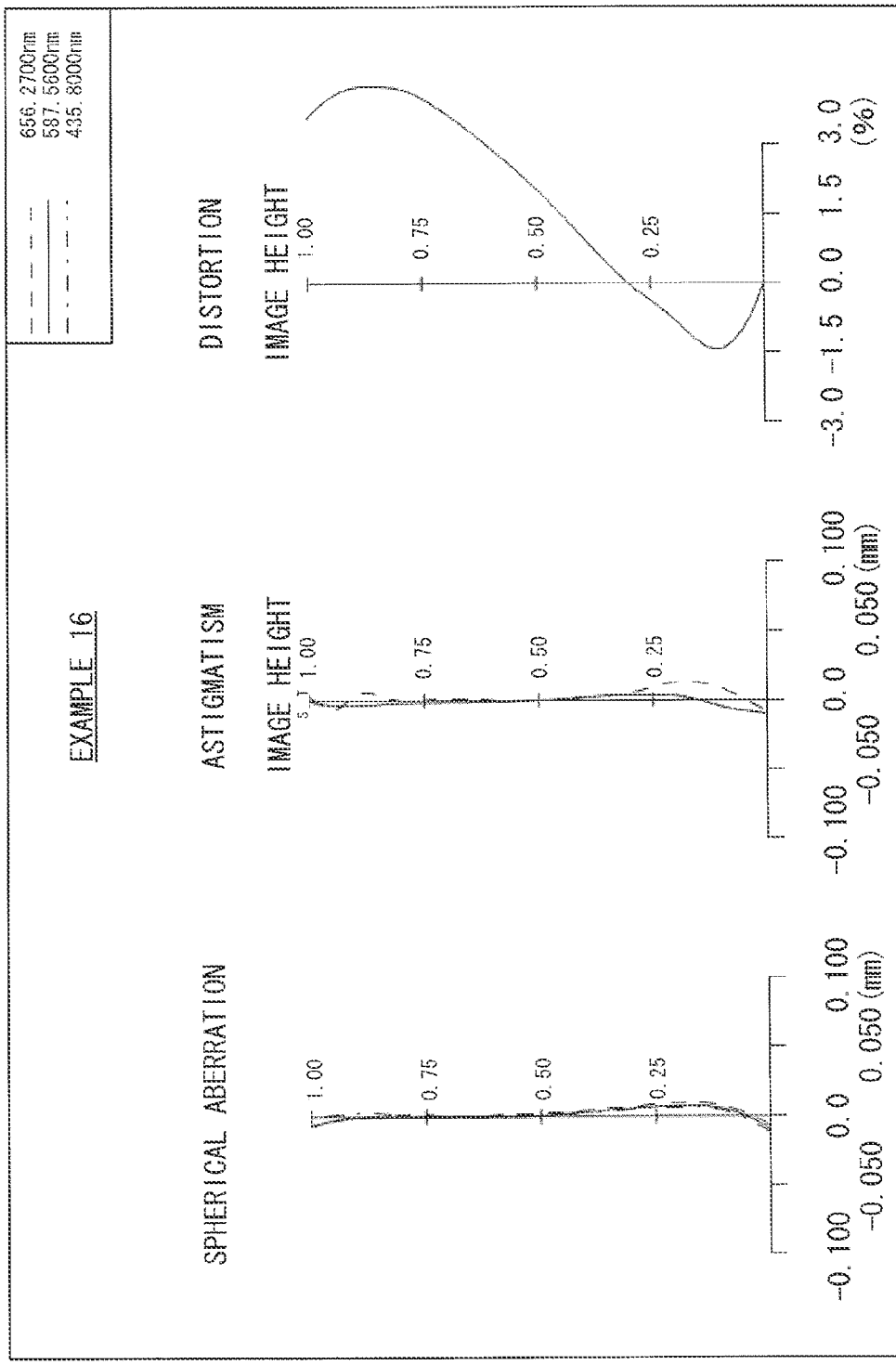
FIG. 32 is an aberration diagram illustrating spherical aberration, astigmatism, and distortion of an image pickup lens corresponding to Numerical Example 16.

Table 31 and Table 32 each show specific lens data corresponding to the image pickup lens according to the sixteenth configuration example shown in FIG. 16. In particular, Table 31 shows basic lens data thereof, and Table 32 shows data related to the aspherical surfaces. Table 31 also shows values of F-number, the diagonal total angle of view $2\omega$, and the total focal length f.

In this sixteenth configuration example, the fourth lens L4 has negative refractive power. The aperture stop St is arranged on the object plane side of the first lens L1.

TABLE 31

| | |
|---|---|
| FNo | 2.0 |
| f | 1.2 |
| $2\omega$ | 75.8° |

TABLE 31-continued

Example 16. lens data

| lens | Si surface number | Ri curvature radius | Di spacing | Ndi refractive index | vdi Abbe number |
|---|---|---|---|---|---|
| | (STO) | ∞ | −0.082 | — | — |
| L1 | 1 | 0.478 | 0.223 | 1.535 | 56.3 |
| | 2 | 33.487 | 0.020 | — | — |
| L2 | 3 | −8.262 | 0.079 | 1.636 | 23.8 |
| | 4 | 1.255 | 0.106 | — | — |
| L3 | 5 | 1.329 | 0.121 | 1.535 | 56.3 |
| | 6 | 2.063 | 0.077 | — | — |
| L4 | 7 | −1.207 | 0.099 | 1.636 | 23.8 |
| | 8 | −1.641 | 0.074 | — | — |
| L5 | 9 | 2.719 | 0.131 | 1.535 | 56.3 |
| | 10 | 5.459 | 0.045 | — | — |
| L6 | 11 | 0.415 | 0.186 | 1.535 | 56.3 |
| | 12 | 0.307 | 0.124 | — | — |
| SG | 13 | ∞ | 0.027 | 1.518 | 64.1 |
| | 14 | ∞ | 0.151 | — | — |

TABLE 32

Example 16 · aspherical surface data

| Si | K | A3 | A4 | A5 | A6 | A7 | A8 | A9 |
|---|---|---|---|---|---|---|---|---|
| 1 | 1.9890E−01 | — | −4.8891E−01 | — | −8.9354E−01 | — | −2.3704E+00 | — |
| 2 | 1.0000E+01 | — | −3.0443E+00 | — | 7.7679E+01 | — | −1.2643E+03 | — |
| 3 | 1.0000E+01 | 1.7845E−03 | −1.2083E+00 | −3.0281E+01 | 4.7386E+02 | −2.0733E+03 | 4.6584E+03 | −9.9692E+03 |
| 4 | 7.8272E−01 | 2.8810E−01 | −5.1726E+00 | 3.3554E+01 | 1.1631E+00 | −1.1025E+02 | −1.1059E+02 | −1.0649E+03 |
| 5 | 0.0000E+00 | −5.8626E−01 | 2.3300E+00 | −3.3559E+01 | 8.2954E+01 | 1.5230E+01 | −2.6097E+02 | −4.9630E+02 |
| 6 | 1.0558E+01 | −1.3740E−01 | −5.1890E+00 | 1.9447E+01 | −2.7840E+01 | −1.2223E+02 | 2.1758E+02 | 1.1242E+03 |
| 7 | 0.0000E+00 | −1.4187E+00 | 6.2694E−01 | −1.5822E+01 | 1.3335E+02 | 7.6866E+01 | −2.5393E+03 | 7.6796E+03 |
| 8 | 1.0000E+01 | −5.5657E−01 | −9.5293E+00 | 3.6562E+01 | −3.0536E+01 | −1.5448E+01 | 5.5728E+01 | −1.7560E+01 |
| 9 | 1.1792E+01 | 7.1255E−01 | 3.8597E+00 | −1.9766E+01 | −2.4214E+00 | 1.2126E+02 | −1.9093E+02 | −1.8790E+02 |
| 10 | 0.0000E+00 | −9.2640E−01 | 1.1039E+01 | −1.3808E+01 | −2.9845E+01 | 2.9167E+01 | 4.6853E+01 | 2.0347E+01 |
| 11 | −1.2000E+01 | — | −4.0918E+00 | — | 1.4984E+01 | — | −1.6548E+01 | — |
| 12 | −4.4255E+00 | −6.0602E−01 | −3.0148E+00 | 9.1746E+00 | −9.5584E+00 | 9.5140E−01 | −4.7642E+00 | 1.6305E+01 |

| | A10 | A11 | A12 | A13 | A14 | A15 | A16 | A17 |
|---|---|---|---|---|---|---|---|---|
| 1 | −1.3571E+03 | — | −2.6739E+03 | — | 2.3680E+05 | — | −2.1554E+06 | — |
| 2 | 2.5312E+03 | — | 5.3040E+04 | — | −3.7442E+05 | — | 6.1818E+05 | — |
| 3 | 1.4430E+04 | — | — | — | — | — | — | — |
| 4 | 5.8842E+03 | — | — | — | — | — | — | — |
| 5 | 1.2407E+03 | — | — | — | — | — | — | — |
| 6 | −2.6646E+03 | — | — | — | — | — | — | — |
| 7 | −7.8791E+03 | — | — | — | — | — | — | — |
| 8 | −3.5319E+01 | — | — | — | — | — | — | — |
| 9 | 1.1328E+02 | 1.3734E+03 | −1.4327E+03 | — | — | — | — | — |
| 10 | −3.6410E+01 | −1.9130E+02 | 1.6759E+02 | — | — | — | — | — |
| 11 | −8.2909E+00 | — | 1.5864E+01 | — | 9.4964E−01 | — | — | — |
| 12 | −2.9103E+00 | −1.2168E+01 | 5.3354E+00 | — | — | — | — | — |

Other Numerical Data in Examples

Table 33 summarizes values related to the respective conditional expressions described above for each numerical example. As can be seen from Table 33, the value in each numerical example is within the range of the numerical value in each conditional expression.

TABLE 33

| conditional expression | Example 1 | Example 2 | Example 3 | Example 4 | Example 5 | Example 6 | Example 7 | Example 8 |
|---|---|---|---|---|---|---|---|---|
| (1) vd1 − vd2 > 20 | 32.500 | 34.700 | 34.700 | 38.300 | 28.200 | 34.700 | 42.300 | 30.400 |
| (2) 0.05 < f1/|f2| < 1.5 | 0.768 | 0.667 | 0.387 | 0.597 | 0.956 | 0.705 | 0.277 | 0.856 |
| (3) 0.0 < |f2|/f345 < 9.0 | 1.858 | 2.136 | 3.603 | 2.721 | 1.420 | 2.380 | 5.773 | 1.664 |
| (4) 0.0 < f/|f6| < 5.0 | 2.254 | 2.494 | 3.026 | 2.286 | 2.311 | 2.583 | 2.947 | 2.262 |
| (5) |(R9 − R10)/(R9 + R10)| < 1.3 | 0.456 | 0.372 | 0.444 | 0.358 | 0.464 | 0.490 | 0.449 | 0.467 |
| (6) |(R7 − R8)/(R7 + R8)| < 0.8 | 0.157 | 0.356 | 0.212 | 0.301 | 0.144 | 0.331 | 0.216 | 0.146 |
| (7) 0.0 < |R12/f6| < 1.0 | 0.462 | 0.583 | 0.641 | 0.453 | 0.465 | 0.576 | 0.639 | 0.464 |
| (8) 0.0 < |R4/f2| < 1.3 | 0.396 | 0.373 | 1.046 | 0.281 | 0.489 | 0.374 | 0.538 | 0.435 |
| (9) 0.0 < |(R5 − R6)/(R5 + R6)| < 4.0 | 1.193 | 1.331 | 0.086 | 3.061 | 1.184 | 0.909 | 0.076 | 1.216 |
| conditional expression | Example 9 | Example 10 | Example 11 | Example 12 | Example 13 | Example 14 | Example 15 | Example 16 |
| (1) vd1 − vd2 > 20 | 34.700 | 39.600 | 32.500 | 34.700 | 32.500 | 32.500 | 32.500 | 32.500 |
| (2) 0.05 < f1/|f2| < 1.5 | 0.660 | 0.496 | 0.737 | 0.430 | 0.567 | 0.528 | 0.551 | 0.532 |
| (3) 0.0 < |f2|/f345 < 9.0 | 1.708 | 1.945 | 1.992 | 3.285 | 0.825 | 0.241 | 0.642 | 0.211 |
| (4) 0.0 < f/|f6| < 5.0 | 2.100 | 1.727 | 2.318 | 2.817 | 0.735 | 0.285 | 0.563 | 0.224 |
| (5) |(R9 − R10)/(R9 + R10)| < 1.3 | 0.199 | 0.104 | 0.720 | 0.452 | 0.268 | 0.391 | 0.859 | 0.335 |
| (6) |(R7 − R8)/(R7 + R8)| < 0.8 | 0.543 | 0.458 | 0.051 | 0.231 | 0.086 | 0.147 | 0.068 | 0.153 |
| (7) 0.0 < |R12/f6| < 1.0 | 0.591 | 0.539 | 0.452 | 0.648 | 0.159 | 0.070 | 0.134 | 0.057 |
| (8) 0.0 < |R4/f2| < 1.3 | 0.379 | 0.272 | 0.443 | 0.556 | 0.622 | 0.734 | 0.608 | 0.741 |
| (9) 0.0 < |(R5 − R6)/(R5 + R6)| < 4.0 | 0.292 | 0.802 | 0.538 | 0.094 | 0.165 | 0.219 | 0.463 | 0.216 |

[Aberration Performance]

FIGS. 17 to 32 each show aberration performance in each numerical example. In each drawing, spherical aberration, astigmatism, and distortion are shown as aberration diagrams. In the astigmatism diagram, X indicates aberration in a sagittal direction and Y indicates aberration in a meridional (tangential) direction.

As can be seen from each aberration diagram described above, an image pickup lens in which aberration is favorably corrected is achieved in each example.

5. Other Embodiments

The technology according to the present disclosure is not limited to the above description of the preferred embodiment and examples, and may be variously modified. For example, all shapes and numeral values of each section shown in the above-described numerical examples are mere examples to carry out the present technology, and the technical scope of the present technology should not be construed limitedly based thereon.

Moreover, in the above-described embodiment and examples, description has been given of the configuration substantially including six lenses. However, a configuration that further includes a lens having substantially no refractive power may be adopted.

It is possible to achieve at least the following configurations from the above-described example embodiment of the disclosure.

(1) An image pickup lens including:
in recited order from object plane toward image plane,
a first lens having positive refractive power;
a second lens having negative refractive power;
a third lens having positive refractive power;
a fourth lens having positive or negative refractive power;
a fifth lens having positive refractive power; and
a sixth lens having negative refractive power and having optical surfaces, one or more of the optical surfaces each having an aspherical shape with one or more inflection points.
(2) The image pickup lens according to (1), wherein the first lens has a convex surface that faces toward the object plane.
(3) The image pickup lens according to (1) or (2), wherein the second lens has a concave surface that faces toward the image plane.
(4) The image pickup lens according to any one of (1) to (3), wherein following conditional expression is satisfied, $$vd1-vd2>20 \tag{1}$$

where vd1 is an Abbe number of the first lens, at d-line having a wavelength of 587.6 nanometers, and
vd2 is an Abbe number of the second lens, at d-line.
(5) The image pickup lens according to any one of (1) to (4), wherein following conditional expression is satisfied, $$0.05<f1/|f2|<1.5 \tag{2}$$

where f1 is a focal length of the first lens, and
f2 is a focal length of the second lens.
(6) The image pickup lens according to any one of (1) to (5), wherein following conditional expression is satisfied, $$0.0<|f2|/(f345)<9.0 \tag{3}$$

where f345 is a combined focal length of the third lens, the fourth lens, and the fifth lens.
(7) The image pickup lens according to any one of (1) to (6), wherein following conditional expression is satisfied, $$0.0<f/|f6|<5.0 \tag{4}$$

where f is a total focal length of the image pickup lens, and
f6 is a focal length of the sixth lens.
(8) The image pickup lens according to any one of (1) to (7), wherein following conditional expression is satisfied, $$|(R9-R10)/(R9+R10)|<1.3 \tag{5}$$

where R9 is a paraxial curvature radius of an object-sided surface of the fifth lens, and
R10 is a paraxial curvature radius of an image-sided surface of the fifth lens.

(9) The image pickup lens according to any one of (1) to (8), wherein following conditional expression is satisfied, $$|(R7-R8)/(R7+R8)|<0.8 \qquad (6)$$

wherein R7 is a paraxial curvature radius of an object-sided surface of the fourth lens, and R8 is a paraxial curvature radius of an image-sided surface of the fourth lens.

(10) The image pickup lens according to any one of (1) to (9), further including a lens having substantially no refractive power.

(11) An image pickup unit with an image pickup lens and an image pickup device outputting an image pickup signal based on an optical image formed by the image pickup lens, the image pickup lens including:

in recited order from object plane toward image plane,
a first lens having positive refractive power;
a second lens having negative refractive power;
a third lens having positive refractive power;
a fourth lens having positive or negative refractive power;
a fifth lens having positive refractive power; and
a sixth lens having negative refractive power and having optical surfaces, one or more of the optical surfaces each having an aspherical shape with one or more inflection points.

(12) The image pickup unit according to (11), wherein the image pickup lens further includes a lens having substantially no refractive power.

The present application contains subject matter related to that disclosed in Japanese Priority Patent Application JP 2012-187996 filed in the Japan Patent Office on Aug. 28, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An image pickup lens comprising:
in recited order from object plane toward image plane,
a first lens having positive refractive power;
a second lens having negative refractive power;
a third lens having positive refractive power;
a fourth lens having positive or negative refractive power;
a fifth lens having positive refractive power; and
a sixth lens having negative refractive power and having optical surfaces, one or more of the optical surfaces each having an aspherical shape with one or more inflection points
wherein following conditional expression is satisfied, $$|(R9-R10)/(R9+R10)|\leq 0.859$$

where R9 is a paraxial curvature radius of an object-sided surface of the fifth lens, and R10 is a paraxial curvature radius of an image-sided surface of the fifth lens.

2. The image pickup lens according to claim 1, wherein the first lens has a convex surface that faces toward the object plane.

3. The image pickup lens according to claim 1, wherein the second lens has a concave surface that faces toward the image plane.

4. The image pickup lens according to claim 1, wherein following conditional expression is satisfied, $$vd1-vd2>20 \qquad (1)$$

where vd1 is an Abbe number of the first lens, at d-line having a wavelength of 587.6 nanometers, and vd2 is an Abbe number of the second lens, at d-line.

5. The image pickup lens according to claim 1, wherein following conditional expression is satisfied, $$0.05<f1/|f2|<1.5 \qquad (2)$$

where f1 is a focal length of the first lens, and
f2 is a focal length of the second lens.

6. The image pickup lens according to claim 1, wherein following conditional expression is satisfied, $$0.0<|f2|/(f345)<9.0 \qquad (3)$$

where f345 is a combined focal length of the third lens, the fourth lens, and the fifth lens.

7. The image pickup lens according to claim 1, wherein following conditional expression is satisfied, $$0.0<f/|f6|<5.0 \qquad (4)$$

where f is a total focal length of the image pickup lens, and
f6 is a focal length of the sixth lens.

8. The image pickup lens according to claim 1, wherein following conditional expression is satisfied, $$|(R7-R8)/(R7+R8)|<0.8 \qquad (6)$$

wherein R7 is a paraxial curvature radius of an object-sided surface of the fourth lens, and R8 is a paraxial curvature radius of an image-sided surface of the fourth lens.

9. An image pickup unit with an image pickup lens and an image pickup device outputting an image pickup signal based on an optical image formed by the image pickup lens, the image pickup lens comprising:

in recited order from object plane toward image plane,
a first lens having positive refractive power;
a second lens having negative refractive power;
a third lens having positive refractive power;
a fourth lens having positive or negative refractive power;
a fifth lens having positive refractive power; and
a sixth lens having negative refractive power and having optical surfaces, one or more of the optical surfaces each having an aspherical shape with one or more inflection points, wherein following conditional expression is satisfied, $$|(R9-R10)/(R9+R10)|\leq 0.859$$

where R9 is a paraxial curvature radius of an object-sided surface of the fifth lens, and R10 is a paraxial curvature radius of an image-sided surface of the fifth lens.

* * * * *